United States Patent
Kremen

(10) Patent No.: US 9,031,874 B2
(45) Date of Patent: *May 12, 2015

(54) METHODS, SYSTEMS AND AGREEMENTS FOR INCREASING THE LIKELIHOOD OF REPAYMENTS UNDER A FINANCING AGREEMENT FOR RENEWABLE ENERGY EQUIPMENT

(75) Inventor: Gary Kremen, Menlo Park, CA (US)

(73) Assignee: Clean Power Finance, Inc., San Francisco, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/730,159

(22) Filed: Mar. 23, 2010

(65) Prior Publication Data

US 2010/0223180 A1  Sep. 2, 2010

Related U.S. Application Data

(63) Continuation-in-part of application No. 11/750,941, filed on May 18, 2007, now Pat. No. 7,698,219, which is a continuation-in-part of application No. 11/653,167, filed on Jan. 12, 2007, now abandoned, (Continued)

(51) Int. Cl.
| | |
|---|---|
| *G06Q 40/00* | (2012.01) |
| *G06Q 10/10* | (2012.01) |
| *G06Q 20/10* | (2012.01) |
| *G06Q 40/02* | (2012.01) |

(52) U.S. Cl.
CPC .............. *G06Q 10/10* (2013.01); *G06Q 20/102* (2013.01); *G06Q 40/00* (2013.01); *G06Q 40/02* (2013.01); *Y04S 10/58* (2013.01); *Y04S 50/12* (2013.01)

(58) Field of Classification Search
USPC ........................ 705/35–45, 412; 700/286, 745
See application file for complete search history.

(56) References Cited

U.S. PATENT DOCUMENTS

| | | | |
|---|---|---|---|
| 4,337,466 A | 6/1982 | Spahn | |
| 4,346,442 A | 8/1982 | Musmanno | |
| 4,376,978 A | 3/1983 | Musmanno | |

(Continued)

FOREIGN PATENT DOCUMENTS

| | | | |
|---|---|---|---|
| DE | 3805677 A1 | 9/1989 | |
| DE | 3918203 A1 | 12/1990 | |

(Continued)

OTHER PUBLICATIONS

Co-pending U.S. Appl. No. 11/652,712, filed Jan. 12, 2007.

(Continued)

*Primary Examiner* — Richard C Weisberger
(74) *Attorney, Agent, or Firm* — Perkins Coie LLP

(57) ABSTRACT

A system is provided for increasing the probability of timely receiving payment under an agreement between a consumer and a non-utility entity for providing financing for renewable energy consumer premises equipment (CPE) by the consumer for power generation at a consumer premises, the renewable energy CPE adapted to deliver power onto a power grid or to the consumer's premises, the system comprising: a computer for monitoring consumer financial information for by the non-utility entity to detect the consumer's financing default in accordance with the agreement, wherein the renewable energy CPE including a PV array and a control device coupled to the PV array for controlling the operation of the PV array and any power generated by the CPE upon a default detected by the computer.

17 Claims, 7 Drawing Sheets

Related U.S. Application Data and a continuation-in-part of application No. 11/653,052, filed on Jan. 12, 2007, now Pat. No. 7,890,436, and a continuation-in-part of application No. 11/653,043, filed on Jan. 12, 2007, now abandoned, and a continuation-in-part of application No. 11/652,712, filed on Jan. 12, 2007, now abandoned, and a continuation-in-part of application No. 11/653,044, filed on Jan. 12, 2007, now abandoned, and a continuation-in-part of application No. 11/653,325, filed on Jan. 12, 2007, now abandoned.

(56) References Cited

U.S. PATENT DOCUMENTS

| | | | |
|---|---|---|---|
| 4,383,210 | A | 5/1983 | Wilkinson |
| 4,597,046 | A | 6/1986 | Musmanno et al. |
| 4,774,663 | A | 9/1988 | Musmanno et al. |
| 4,993,348 | A | 2/1991 | Wald |
| 5,694,552 | A | 12/1997 | Aharoni |
| 5,940,809 | A | 8/1999 | Musmanno et al. |
| 6,025,774 | A | 2/2000 | Forbes |
| 6,154,730 | A | 11/2000 | Adams et al. |
| 6,191,501 | B1 | 2/2001 | Bos |
| 6,195,648 | B1 * | 2/2001 | Simon et al. ............. 705/40 |
| 6,521,129 | B1 | 2/2003 | Stamper et al. |
| 6,553,353 | B1 | 4/2003 | Littlejohn |
| 6,717,527 | B2 | 4/2004 | Simon |
| 6,785,592 | B1 | 8/2004 | Smith et al. |
| 6,828,692 | B2 | 12/2004 | Simon |
| 6,870,467 | B2 | 3/2005 | Simon |
| 6,914,411 | B2 | 7/2005 | Couch et al. |
| 6,947,854 | B2 | 9/2005 | Swarztrauber et al. |
| 6,980,973 | B1 | 12/2005 | Karpenko |
| 7,171,287 | B2 | 1/2007 | Weiss |
| 7,191,150 | B1 | 3/2007 | Shao et al. |
| 7,274,975 | B2 | 9/2007 | Miller |
| 7,512,540 | B2 | 3/2009 | Gluck et al. |
| 7,698,219 | B2 * | 4/2010 | Kremen et al. ............. 705/40 |
| 7,890,436 | B2 | 2/2011 | Kremen |
| 2002/0035496 | A1 | 3/2002 | Fukushima et al. |
| 2002/0040356 | A1 | 4/2002 | Gluck et al. |
| 2002/0084645 | A1 | 7/2002 | Lobert et al. |
| 2002/0091653 | A1 | 7/2002 | Peevey |
| 2002/0103745 | A1 | 8/2002 | Lof et al. |
| 2002/0120569 | A1 | 8/2002 | Day |
| 2002/0128853 | A1 | 9/2002 | Kikuchi et al. |
| 2002/0143438 | A1 | 10/2002 | Akiyama et al. |
| 2002/0143693 | A1 | 10/2002 | Soestbergen et al. |
| 2002/0194145 | A1 | 12/2002 | Boucher et al. |
| 2003/0023467 | A1 | 1/2003 | Moldovan |
| 2003/0028479 | A1 | 2/2003 | Kirksey |
| 2003/0074244 | A1 | 4/2003 | Braxton |
| 2003/0080876 | A1 | 5/2003 | Martin |
| 2003/0093345 | A1 | 5/2003 | Cutbirth |
| 2003/0126060 | A1 | 7/2003 | Lof et al. |
| 2003/0144864 | A1 | 7/2003 | Mazzarella |
| 2004/0083163 | A1 | 4/2004 | Cooper |
| 2004/0117223 | A1 | 6/2004 | Smith |
| 2004/0138981 | A1 | 7/2004 | Ehlers et al. |
| 2005/0086341 | A1 | 4/2005 | Enga et al. |
| 2005/0137956 | A1 | 6/2005 | Flory et al. |
| 2005/0165672 | A1 | 7/2005 | Pembroke |
| 2006/0031180 | A1 | 2/2006 | Tamarkin et al. |
| 2006/0064366 | A1 | 3/2006 | Smith |
| 2006/0074794 | A1 | 4/2006 | Nespola |
| 2006/0080246 | A1 | 4/2006 | Wyckoff |
| 2006/0276938 | A1 | 12/2006 | Miller |
| 2006/0277131 | A1 | 12/2006 | Bacon et al. |
| 2007/0055595 | A1 | 3/2007 | Keyes et al. |
| 2007/0150366 | A1 | 6/2007 | Yahiro et al. |
| 2007/0219932 | A1 | 9/2007 | Carroll et al. |
| 2008/0086411 | A1 | 4/2008 | Olson et al. |
| 2008/0091580 | A1 | 4/2008 | Kremen |
| 2008/0091581 | A1 | 4/2008 | Kremen |
| 2008/0091589 | A1 | 4/2008 | Kremen |
| 2008/0091590 | A1 | 4/2008 | Kremen |
| 2008/0091625 | A1 | 4/2008 | Kremen |
| 2008/0091626 | A1 | 4/2008 | Kremen |
| 2008/0172330 | A1 | 7/2008 | Kremen et al. |
| 2009/0024541 | A1 | 1/2009 | Kremen |

FOREIGN PATENT DOCUMENTS

| | | |
|---|---|---|
| EP | 0342578 A1 | 11/1989 |
| FR | 2689333 A1 | 10/1993 |
| FR | 2746941 A1 | 10/1997 |
| GB | 2100528 A | 12/1982 |
| GB | 2281401 A | 3/1995 |
| JP | 10165232 A | 6/1998 |
| JP | 2003122819 A | 4/2003 |
| WO | WO-8806814 A1 | 9/1988 |
| WO | WO-9852003 A1 | 11/1998 |

OTHER PUBLICATIONS

Co-pending U.S. Appl. No. 11/653,043, filed Jan. 12, 2007.
Co-pending U.S. Appl. No. 11/653,044, filed Jan. 12, 2007.
Co-pending U.S. Appl. No. 11/653,052, filed Jan. 12, 2007.
Co-pending U.S. Appl. No. 11/653,167, filed Jan. 12, 2007.
Co-pending U.S. Appl. No. 11/653,325, filed Jan. 12, 2007.
Co-pending U.S. Appl. No. 11/750,941, filed May 18, 2007.
Co-pending U.S. Appl. No. 11/781,127, filed Jul. 20, 2007.
Co-pending U.S. Appl. No. 11/958,346, filed Dec. 17, 2007.
Non-Final Office Action Mailed Dec. 31, 2008 in Co-pending U.S. Appl. No. 11/958,346, filed Dec. 17, 2007.
Non-Final Office Action Mailed Feb. 22, 2010 in Co-pending U.S. Appl. No. 11/781,127, filed Jul. 20, 2007.
Non-Final Office Action Mailed Feb. 23, 2009 in Co-pending U.S. Appl. No. 11/653,043, filed Jan. 12, 2007.
Non-Final Office Action Mailed Feb. 26, 2000 in Co-pending U.S. Appl. No. 11/750,941, filed May 18, 2007.
Non-Final Office Action Mailed Feb. 4, 2008 in Co-pending U.S. Appl. No. 11/750,941, filed May 18 2007.
Final Office Action Mailed Sep. 25, 2008 in Co-pending U.S. Appl. No. 11/750,941, filed May 18, 2007.
Notice of Allowance Mailed Nov. 3, 2009 in Co-pending U.S. Appl. No. 11/750,941, filed May 18, 2007.
Non-Final Office Action Mailed Oct. 30, 2008 in Co-pending U.S. Appl. No. 11/652,712, filed Jan. 12, 2007.
Final Office Action Mailed Jul. 31, 2009 in Co-pending U.S. Appl. No. 11/652,712, filed Jan. 12, 2007.
Non-Final Office Action Mailed Jun. 25, 2009 in Co-pending U.S. Appl. No. 11/653,044, filed Jan. 12, 2007.
Non-Final Office Action Mailed Jan. 15, 2010 in Co-pending U.S. Appl. No. 11/653,052, filed Jan. 12, 2007.
"Attaining Financial Sustainability", pp. 49-55 (rev. Apr. 17, 2002).
"CDM Financing" pp. 1-91 (Feb. 2006). http://www.conservationbureau.on.ca/Storage/14/1913/_CDM_Financing.pdf).
"Leasing to Support Small Businesses and Microenterprises," 2002, pp. 1-3 and 28.
"Starter-Interrupt Device is the New High-Tech Repo Man," Jun. 19, 2006, http://cartracker500.com/2006/06/19/starter-interrupt-device-is-the-new-high-tech-repo-man/#more-89.
"The OnGrid Solar Financial Analysis Tool Contract License Agreement," OnGrid Solar Contract License Agreement, 2004, pp. 1-4.
AEP Ohio. Tampering with Electric Meter Dangerous, Constitutes Theft of Engergy. Apr. 27, 2005 p. 1-2.
Ameresco, "Connect to Smarter Energy Solutions, How Energy Savings Performance Contraction (ESPC) Works," http://www.ameresco.com, 2006.
Bartow County Utility Permitting Procedures (2006). p. 1-16.
Basic Big Apple Solar Installation Commitment, "Basic Partnership New York City Million Solar Roofs initiative Executive Summary," Basic c/o Solar Energy Systems, Brooklyn, NY (published Jun. 26, 2003), 5 pgs.

(56) References Cited

OTHER PUBLICATIONS

Basic Big Apple Solar Installation Commitment, "Guide to Solar System Financing," Big Apple Solar Installation Commitment, NY (2004), www.basicsolar.org, 2 pgs.
Borrergo Solar FAQ (2006); As viewed on the internet archive, http://web.archive.org/web20060222232937/http://borregosolar.com/resources/solar-energy-facts.php: pp. 1-6.
California Energy Commission, "Consumer Energy Center—List of Companies Financing Solar, Wind and Other Energy Systems," http://www.consumerenergycenter.org/erprebate/financialcompanies, (Updated May 23, 2006), 4 pgs.
California Energy Commission, "Financing Options Fact Sheet—Residential Financing Options for Renewable Energy Systems," Renewable Energy Program, Sacramento, CA (May 2004), 2 pgs.
California Energy Commission, "Institutional Financing Options for Renewable Energy Systems, Financing Options Fact Sheet," Oct. 2002; http://www.greenlighsolar.com/pdf/institutional_financing.pdf; retrieved Jul. 24, 2009, 2 pgs.
California Energy Commission, "Residential Financing Options for Renewable Energy Systems. Financing Options Fact Sheet", Dec. 2002, http://www.utilityfree.com/pdf/refinance.pdf, Retrieved Jul. 24, 2009, 2 pgs.
Califorina Public Utilities Commission, "PUC Business Meeting," (Dec. 11, 2006), see http://www.cpuc.ca.gov., 2 pgs.
Campbell, H., "Black's Law Dictionary," Fifth Edition, 1979, pp. 1-6.
Citizenre Renu, Forward Rental Agreement General Terms and Conditions. p. 1-6.
clarkpublicutilities.com, "Remote Meter Reading," May 15, 2004, 2 pgs., http://www.clarkpublicultilities.com/Residential/meterRading/remoteMeterReading.
Clay Electric Cooperative, Inc., Remote Meter Reading, 2 pgs. (Aug. 2003).
Comtech Holdings Limited, *Automatic Meter Reading—AMR(Modems)/Telemetry Examples,* Copyright Comtech Holdings Limited, 3 pgs. (2006).
Contracts 2d. Pamphlet No. 1-3. As Adopted and Promulgated by the American Law Institute, 1981, p. 1-5.
Dallas Semiconductor—Maxim, "Application Note 3875—Power Meter Reference Design Enables Automatic Meter Reading with Communication Over the Powerline," PLC/AM, Application Note 3875, Jun. 30, 2006, 3 pgs.
Dow Jones Indexes, "Dow Jones U.S. Daily Electricity Prices Indexes," (Reporting Year 2006), 2 pgs.
Endecon Engineering, "A Guide to Photovoltaic (PV) System Design and Installation," San Ramon, CA, USA, Jun. 2001, 1-40 pgs.
Energy Resource, "SunEdison Ready to Begin Delivery Solar Energy to California State University, Chico," Oct. 26, 2006, p. 1.
Environmental Protection Agency, Alliance to Save Energy, "2. EPA/Alliance to Save Energy, Save Money, Conserve Energy," 2003.
Ernst Publishing, "Real Estate vs. UCC," May 22, 2005, http://www.ernstpublishing.com/uccysre.htm, 4 pgs.
Fat Spaniel Technologies, "Assessment Tool," Fat Spaniel Technologies, Inc., Copyright 2004-2007, http://www.fatspaniel.com/solutions/systems-installer-services.html, 3 pgs.
Ferrey, Steven, "Small Power Purchase Agreement Application for Renewable Energy Development: Lessons from Five Asian Countries," Asia Alternative Energy Program, The World Bank, Washington, D.C., Feb. 2004.
Find Solar, Imagine the Feeling, "My Solar Estimator," and "Find a Solar Pro," 2006.
Findlaw, California Codes, California Civil Code, Civil Code Section 1912-1916.12, (1983), 1-12 pgs.
foreclosurenet.net, "How to Avoid Home-Sale Trouble with Fixtures," 4 pgs., May 12, 2006.
Freeadvice, "Real Estate Law—Commercial Real Estate—Fixtures." Feb. 12, 2004, 2 pgs., http://real-estate-law.freeadvice.com/commercial_real_estate/fixtures.com.
Gallardo, J. , World Bank Working Paper 1857, "Leasing to Support Small Businesses and Microenterprises" pp. 1-39 (2002).

Harmon, S., "GMAC Mortgage Offers Financing for Solar," GMAC Mortgage, 1999, Retrieved Jul. 24, 2009, 3 pgs., http://www.resnet.us/ratings/overview/resources/gmac.htm.
Home Power—The Hands-On Journal of Home-Made Power, Making Sense of Solar-Electric System Costs, Home Power 109, 7 pgs., (Oct. & Nov. 2005), www.homepower.com.
HowStuffWorks, "How Power Grids Work," HowStuffWorks, Inc., Oct. 27, 2005, 12 pgs., http://science.howstuffworks.com/power.htm/printable.
HowStuffWorks, Inc., "How Solar Cells Work," Oct. 27, 2005, 6 pgs., http://science.howstuffworks.com/solar-cell.htm/printable.
http://www.passtimeusa.com/ourproducts.htm, Starter Interrupt Devices, 1997.
http://www.ppsontime.com/PRODUCTS/tabid/54/Defualt.aspx, Starter Interrupt Device, 2005.
Kistner and Price. Financing Solar Thermal Power Plants. National Renewable Energy Laboratory. Apr. 11-14, 1999. p. 1-8.
Lamonica, M., "Pumping, Power Onto the Grid From Your Basement," c/net News.com, Aug. 10, 2006.
Larson, Aaron. Durable Power of Attorney Form. Aug. 2003, p. 1-3.
Laudicina, D., "The Emerging Law of Starter Interrupt Devices," Business Lawyer, Feb. 1, 2006.
Legal Services of North Dakota. Help! My Power Has Been Shut Off. Apr. 2004, p. 1-2.
Madison Gas and Electric, "Solar Basics", http://www.mge.com/environment/solar/solarbasics.htm., Jul. 18, 2006, pp. 1-3.
McClintock, M., "Solar Electric Dealers 2004: Dynamic Markets, Significant Opportunities, Challenging Treats," Coast-Hills Partners, Portola Valley, CA, Copyright 2004-2005, pp. 1-114.
Montana Department of Environmental Quality. Net metering and easements. Jul. 2002 p. 1-2.
National Renewable Energy Laboratory, "PVwatts—A Performance Calculator for Grid Connected PV Systems," 2006.
New Hope & Ivyland Railroad, "Temporary License Permitting Entry on Property," Rev. Jun. 2002.
New Jersey's Clean Energy Program TM, "New Jersey Solar Renewable Energy Certificate Program," Jul. 10, 2006, 2 pgs.
New Jersey's Clean Energy Programtm, "Current SREC Trading Statistics, Through Dec. 2006, Reporting Year 2007," (for production between Jun. 1, 2006-May 31, 2007), 2 pgs.
New Jersey's Clean Energy Programtm, "New Jersey Solar Renewable Energy Certificate Program," May 6, 2006, 4 pgs.
New York Energy $martsm Loan Fund, "Application Kit for Existing 1-4 Family Homes," New York State Energy Research and Development Authority, Albany, NY, May 8, 2006, 9 pgs.
New York Energy $martsm Loan Fund, "Lender Kit," New York State Energy Research and Development Authority, Albany, NY, Revised May 2006, 74 pgs.
New York Energy $martsm Loan Fund, "Policy and Procedures Manual," Revised May 2006, pp. 1-19.
New York Energy $martsm, Solar Power—NYSERDA's Clean Power Estimator for Solar-Electric or Photovoltaic (PV) System, Copyright 1998-2002, 10 pgs.
Noresco, "Energy Savings Performance Contracting Solutions," Oct. 29, 2004, 1 pg., http://www.noresco.com/site/content/ei_espc_financial.asp.
Northern Arizona Wind & Sun, "Solar Basics, Solar Maps," Last Updated May 12, 2006, 6 pgs, http://www.windsun.com/Solar_Basics/Solar_maps.htm.
Nyseg, "Reading Your Meter," 2006, 8 pgs.
Ohio Department of Development Clean Power Estimator, Ohio Department of Development, http://www.clean-power.com/ohio/, Aug. 9, 2006, pp. 1-3.
OnGrid Solar, "The OnGrid Solar Financial Analysis Tool User Manual Version 3.0", Updated Feb. 27, 2007, pp. 1-35.
Pacific Gas & Electric Schedule E-2, "Experimental Residential Time-Of-Use Service," Mar. 25, 2003.
Paul A. Cillo & Harlan Lachman, Energy Efficiency Institute; Daniel Rosenblum & Fred Zalcman, Pace Energy Project "Potential for Development of Pays in New York State" pp. 1-18 and Appendices pp. 1-11 (Aug. 3, 2005).

(56) References Cited

OTHER PUBLICATIONS

Pedreira, T., "Security Interests—The Basics, Lexis-Nexis," Copyright 2002, http://debtor-creditor.lawyers.com/creditors-rights/Security-Interests--The Basics.html.
Personal Property Foreclosure, Chapter 3, Civil Benchbook, pp. 121-136 (Rev. Jul. 1, 2003).
PG&E Rule 11—Discontinuance and Restoration Serivce ER11.pdf, 13 pgs (Jun. 1, 2003).
PG&E, Services for Medical Baseline and Life-Support Customers, 1 pg (copyright 2007).
PG&E, Tariffs, 2 pgs (copyright 2006).
Powair, Van Jamison, The "Green" Value of Renewable Power, Renewable Energy Credits, "Green Tags," Harvesting Clean Energy Conference, Van Jamison, Powair, Jan. 21, 2004, 12 pgs.
Presta, "Understanding Fee Schedule 2005," as viewed at http://web.archive.org/web/20051127063731/http://www.presaappraisal.com/fee.php.
Russell, S., "Solar-Electric Systems Simplified," Home Power 104, Dec. 2004 and Jan. 2005. pp. 104:72-78.
Samuelson, Pamela ,Legally Speaking: Embedding Technical Self-Help in Licensed Software (Published in Communications of the ACM 40(10): 6 pgs) (Oct. 13, 1997).
San Isabel Electric Association, Inc., "Take the Mystery Out of Your Electric Meter," San Isabel Electric, Copyright 2005, 5 pgs., http:ww/siea.com/meter.cfm.
SEIA Solar Energy Industries Association, "Guid to Federal Tax Incentives for Solar Energy", 40 pgs (Released May 26, 2006).
Selco Solar Lanka Limited, Sri Lanka; 2003, pp. 1-5.
Sharp, "The Components That Make Up a Residential Solar System," Sharp Electronics Corporation, Copyright 2006, 2 pgs., http://www.sharpusa.com/solar/system_basics/0.2465.1-2.00.html.
Solar4Power, "The Basics of Solar Power for Producing Elctricity," Feb. 11, 2004, 5 pgs., http://wwww.solar4power.com/solar-power-basics.html.
Speizman Industries Receives Notice of Default from Lender. PR NewsWire. Feb. 17, 2004 p. 1-2.
Starke and Starke, "Mortgage Lending and Investing: Understanding Risks in a Changing Market," 1991.
Sun Edison website (2006), As viewed on the internet archive, http://web.archive.org/web/20060307151552/www.sunedison.com; pp. 1-7.
Tamarkin, T.D., "Automatic Meter Reading," Sep. 1992, 6 pgs., http://www.energycite.com/amr.htm.
The New York Times. Patient on Life Support Dies After Power is Cut. Sep. 24, 1989. p. 1.
The Nikkei Weekly (Japan), "Due Diligence on Property Prices," Oct. 12, 1998, pp. 1-2.
Title 9-A Maine Consumer Credit Code, 2 pgs, (Oct. 31, 2006).
Tropos Networks, "MetroMesh and Automated Meter Reading: A Winning Combination," A Technology Brief, Sunnyvale, CA, Aug. 2005, 6 pgs.
U.S. Department of Energy, "The Borrower's Guide to Financing Solar Energy Systems—A Federal Overview." Mar. 1999, Second Edition, A Revision of DOE/GO-10098-660, USA, Sep. 1998, pp. 1-40.
UCC: Uniform Commercial Code, "U.C.C.—Article 2A—Leases . . . Part 3, Effect of Lease Contract," Copyright 2005, 2 pgs., http://www.law.cornell.edu/ucc/2A/2A-309.html.
Uniform Computer Information Transactions Act, Copyright 2002.
Weise, S.O., "A Comparison of Current and Revised Article 9," 1995, pp. 105-125.
White and Summers, "Uniform Commerical Code"; 4th version, West Publishing Company, 1995; pp. 1-38.
Wiles, J., "Code Corner—Working with Inspectors—What Your Checklist Should Include," Home Power 113, Jun. & Jul. 2006, pp. 94-96.
Wiles, J., Making the Utility Connection, IAEI News, Oct. 2005, pp. 2-10.
Zocchetti, Kate, California Energy Commission, "Buying a Photovoltaic Solar Electric System—A Consumer Guide," Sacramento, CA USA, Mar. 23, 2003, pp. 1-28.
Supplemental Non-Final Office Action Mailed Mar. 22, 2010 in Co-pending U.S. Appl. No. 11/781,127, filed Jul. 20, 2007.
Final Office Action Mailed Oct. 29, 2010 in Co-pending U.S. Appl. No. 11/781,127, filed Jul. 20, 2007.
Notice of Allowance Mailed Oct. 20, 2010 in Co-pending U.S. Appl. No. 11/653,052, filed Jan. 12, 2007.
Co-Pending U.S. Appl. No. 13/027,134, filed Feb. 14, 2011.
Co-Pending U.S. Appl. No. 13/098,194, filed Apr. 29, 2011.
Co-Pending U.S. Appl. No. 13/761,073, filed Feb. 6, 2013.
Restriction Requirement mailed Mar. 30, 2009 in Co-Pending U.S. Appl. No. 11/653,167, filed Jan. 12, 2007.
Restriction Requirement mailed Sep. 30, 2009 in Co-Pending U.S. Appl. No. 11/653,052, filed Jan. 12, 2007.
Non-Final Office Action mailed Aug. 16, 2012 in Co-Pending U.S. Appl. No. 13/027,134, filed Feb. 14, 2011.
Final Office Action mailed Dec. 17, 2012 in Co-Pending U.S. Appl. No. 13/027,134, filed Feb. 14, 2011.
Restriction Requirement mailed Oct. 1, 2008 in Co-Pending U.S. Appl. No. 11/653,043, filed Jan. 12, 2007.
Restriction Requirement mailed Mar. 31, 2009 in Co-Pending U.S. Appl. No. 11/653,325, filed Jan. 12, 2007.
Restriction Requirement mailed Nov. 30, 2007 in Co-Pending U.S. Appl. No. 11/750,941, filed May 18, 2007.
Restriction Requirement mailed Jun. 25, 2009 in Co-Pending U.S. Appl. No. 11/781,127, filed Jul. 20, 2007.
Restriction Requirement mailed Jan. 27, 2012 in Co-Pending U.S. Appl. No. 12/730,159, filed Mar. 23, 2010.
Non-Final Office Action mailed Apr. 16, 2012 in Co-Pending U.S. Appl. No. 12/730,159, filed Mar. 23, 2010.
Non-Final Office Action mailed Oct. 17, 2012 in Co-Pending U.S. Appl. No. 12/730,159, filed Mar. 23, 2010.
Cillo, Paul A. et a., "Potential for Development of Pays® In New York State," http://www.paysamerica.org/Papers/NYSERDAWhitePaper.pdf, 18 pages, Aug. 3, 2005.
Fat Spaniel Technologies, Inc., "System Installers/Integrators Services," http://www.fatspaniel.com/solutions/system-installer-services.html, 2 pages, publication prior to Jan. 12, 2007.
Kane, Edward J., "Political Economy of Subsidizing Agricultural Credit in Developing Countries," Colloquim on Rural Finance, Economic Development Institute, Discussion Paper No. 2, 21 pages, Sep. 1-3, 1981.
Massachusetts Technology Collaborative, "Request for Proposals for Consumer Lending Services," RFP No. 2006-RSL-01, 34 pages, Feb. 23, 2006.
National Renewable Energy Laboratory, "More About PVWATTS," http://rredc.nrel.gov/solar/codes_algs/PVWATTS/moreabout.html, 2 pages, Oct. 5, 2006.
Ohio Department of Development, "Clean Power Estimator for Solar Electric or Photovoltaic (PV) Systems, Wind Electric Systems, Fuel Cell Systems, Energy Efficiency," http://www.clean-power.com/ohio/, 3 pages, downloaded Aug. 9, 2006.
Sharp Electronics Corp., "How Solar Works," http://www.sharpusa.com/solar/how_solar_works/0,2464,1-1,00.html, 1 page, 2006.
Sun Edison LLC, "SunEdison and New Vision Technologies to Merge," 4 pages, Dec. 21, 2005.
U.S. Department of Energy, "The Borrower's Guide to Financing Solar Energy Systems—A Federal Overview," Second Edition, 44 pages, Mar. 1999.
Ottinger, Richard L., "Experience With Promotion of Renewable Energy: Successes and Lessons Learned," Parliamentarian Forum on Energy Legislation and Sustainable Development, 35 pages, Oct. 5-7, 2005.
Pates, Mikkel, "Farm Co-Op Leader Touts Local Owners, Control," Knight Ridder Tribune Business News, 4 pages, Feb. 22, 2005.

* cited by examiner

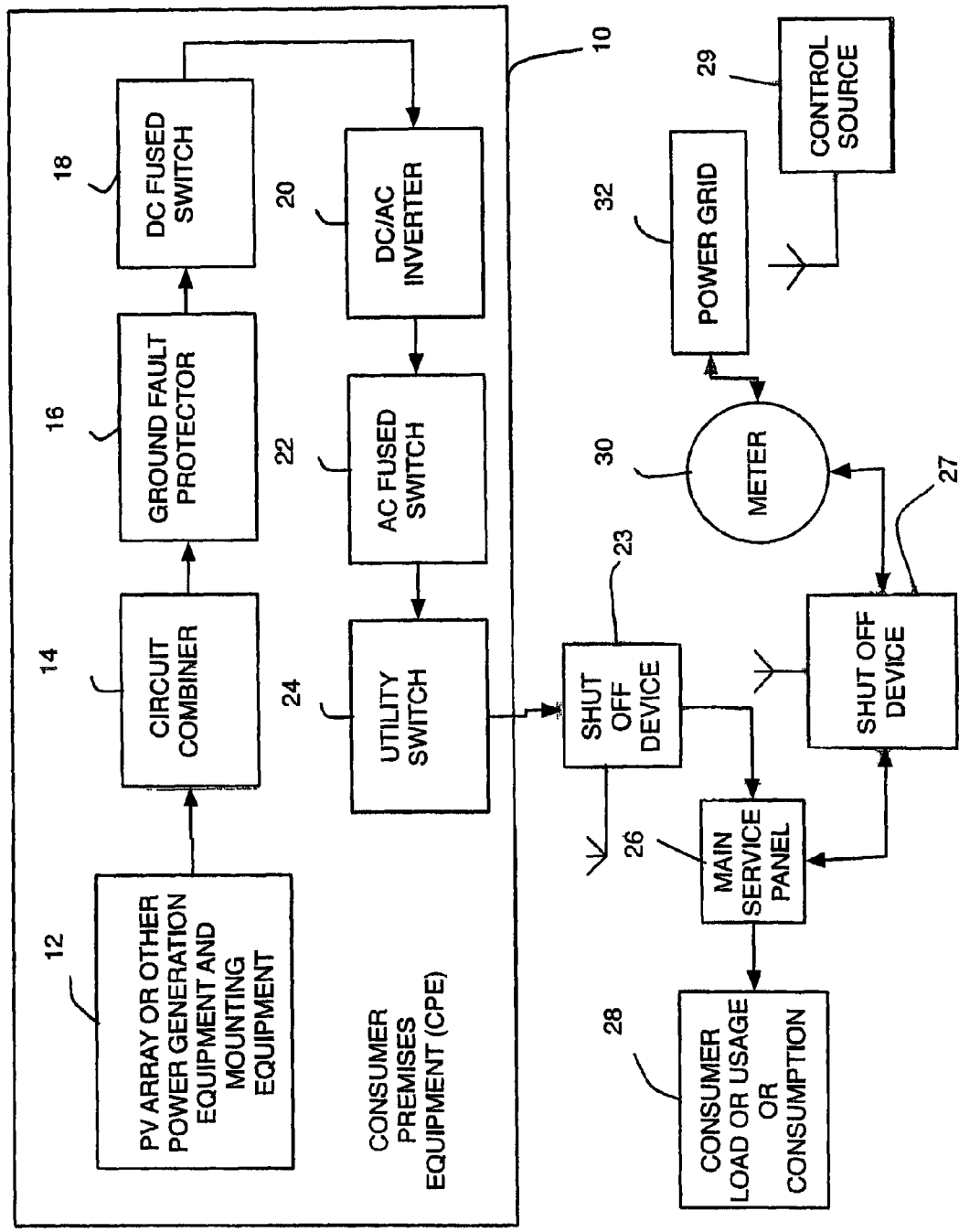

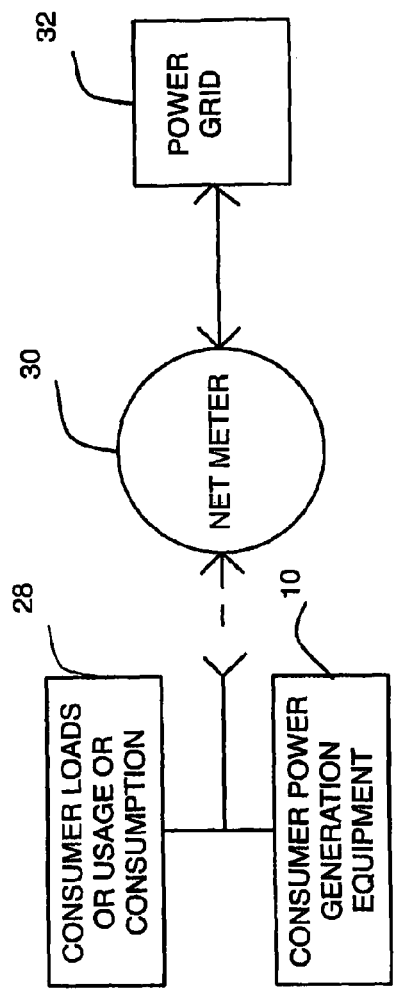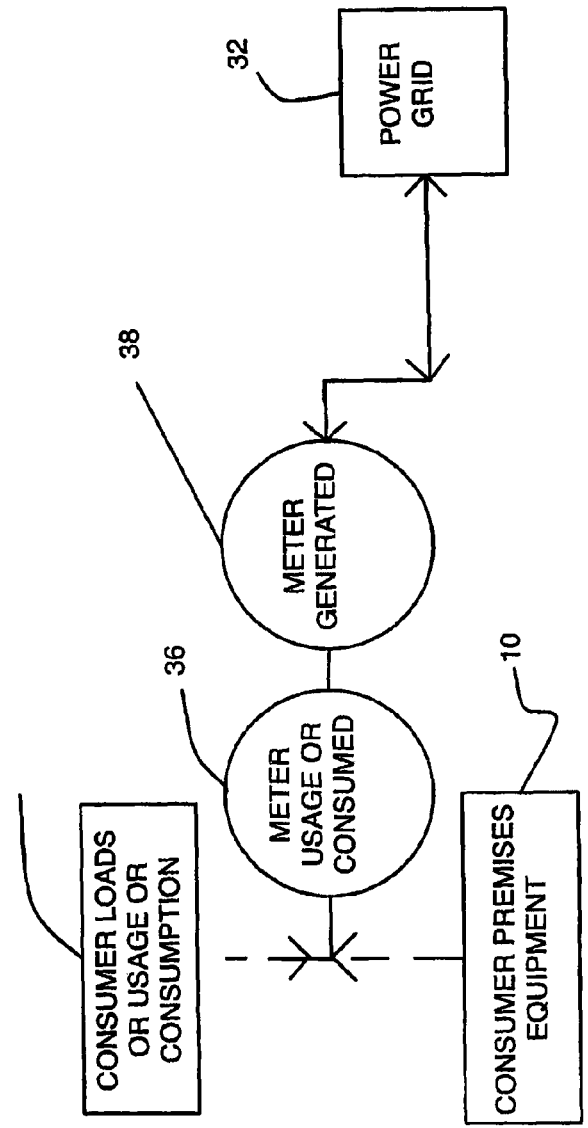
FIG. 2A
FIG. 2B

METHODS, SYSTEMS AND AGREEMENTS FOR INCREASING THE LIKELIHOOD OF REPAYMENTS UNDER A FINANCING AGREEMENT FOR RENEWABLE ENERGY EQUIPMENT

CROSS-REFERENCE TO RELATED APPLICATIONS

The present invention claims priority to and is a continuation-in-part of U.S. application Ser. No. 11/750,941, filed May 18, 2007, entitled METHODS, SYSTEMS AND AGREEMENTS FOR INCREASING THE LIKELIHOOD OF REPAYMENTS UNDER A FINANCING AGREEMENT FOR RENEWABLE ENERGY EQUIPMENT, which is incorporated by reference herein and which claims priority to and is a continuation-in-part of applications: (1) U.S. application Ser. No. 11/653,167, filed Jan. 12, 2007, entitled SYSTEMS, METHODS AND FINANCIAL INSTRUMENTS FOR RENEWABLE ENERGY CONSUMER PREMISES EQUIPMENT FINANCING, now abandoned, (2) U.S. application Ser. No. 11/653,052, filed Jan. 12, 2007, entitled BILLING AND PAYMENT METHODS AND SYSTEMS ENABLING CONSUMER PREMISES EQUIPMENT, (3) U.S. application Ser. No. 11/653,043, filed Jan. 12, 2007, entitled METHODS FOR COST REDUCTION AND UNDERWRITING CONSIDERATIONS FOR FINANCING RENEWABLE ENERGY CONSUMER PREMISES EQUIPMENT (CPE), now abandoned, (4) U.S. application Ser. No. 11/652,712, filed Jan. 12, 2007, entitled METHOD FOR UNDERWRITING THE FINANCING OF SOLAR CONSUMER PREMISES EQUIPMENT, now abandoned, (5) U.S. application Ser. No. 11/653,044, filed Jan. 12, 2007, entitled SYSTEMS AND METHODS OF REDUCING FINANCING COSTS FOR RENEWABLE ENERGY CONSUMER PREMISES EQUIPMENT, now abandoned and (6) U.S. application Ser. No. 11/653,325, filed Jan. 12, 2007, entitled METHODS, SYSTEMS AND FINANCIAL INSTRUMENTS FOR FINANCING RENEWABLE ENERGY CONSUMER PREMISES EQUIPMENT, now abandoned, all of such applications being incorporated by reference herein.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND

The present invention relates to financing renewable energy equipment and more particularly to the ability to increase the likelihood that a consumer will repay a loan for such renewable energy equipment in accordance with an agreement to pay such a loan or will make payments for power generated by renewable energy equipment in accordance with an agreement for the purchase of such power.

Electricity or power is an essential part of modern life. In residences, in businesses, in institutions and in other locations, consumers use electricity in a variety of ways. Utilities typically supply power to consumers as needed. FIG. 1 illustrates a diagram of a power system of the prior art. As is shown, the utilities deliver power generated by power plants through a network of transmission and distribution lines. This network is hereinafter referred to as the "power transmission and distribution grid," "the electric grid," "the grid" or "power grid." Electricity production, demand and costs are discussed in detail in numerous publications. For this reason, these details will be described herein. Suffice it to say, renewable energy is a practical and environmentally conscious alternative to traditional utility production. One of the more desirable renewable sources is solar power. For one thing, local solar energy can essentially be harnessed in most developed country locations with solar access. For another, solar equipment consumes no fossil fuels and generates no air pollutants. The use of solar power is generally regarded as environmentally safe. Utilities in many States are required (or voluntarily do so) for public policy reasons to credit or actually buy excess power generated by a consumer. General rules and requirements of such a purchase are not discussed herein. Suffice it to say, solar energy is quite desirable and beneficial to a consumer. Unfortunately, solar power equipment is quite expensive for a consumer. While the Federal and State incentives are significant, the remaining costs for the purchase of solar equipment may be beyond the amount of cash a consumer has on hand or wishes to commit.

To date, there are limited financing options for the consumer of solar power equipment. These options are predominantly based on traditional financing products known as a mortgage, a secured loan in real property or deed of trust. Such products rely on a security interest in the consumer/borrower's real property. There are other financing options. Secured personal property loans (sometimes referred to as chattel mortgages or loans) and unsecured personal loans are also available for the purchase of solar equipment. Secured personal property loans are typically secured by the personal property. Unsecured loans are not secured at all.

There is yet another financing option available for the consumer. It is known as a Power Purchase Agreement ("PPA"). There are several varieties of a PPA. One example of a PPA is offered by Citizenre company (See Domain page: renu.citizenre.com). In a typical PPA arrangement such as that offered by Citizenre, a party known as the PPA Investor purchases, installs and maintains solar equipment on a consumer's premises. The PPA Investor owns the equipment. In exchange for such equipment, the consumer agrees to purchase power generated by the solar equipment for a period of time (e.g., up to 25 years). A PPA may include is a lease. Depending on the arrangement, PPA might be treated as a capital lease or operating lease. In a PPA, the consumer makes no investment, needs to perform no repairs, need not wait for any rebates and locks in prices for power. The PPA Investor also receives benefits from this arrangement. The PPA Investor may receive financial benefits including investment tax credits (ITC), accelerated depreciation, rebates, subsidies and possibly other benefits (besides consumer payments).

The financing options discussed above (loans, PPA, etc.) unfortunately have disadvantages. The main disadvantage is that there is really no means by which the lender or PPA investor (PPA is a form of financing, in which the PPA investor is a lender) may insure, or increase the likelihood, that the consumer will repay a loan, i.e., make payments for power purchased under a PPA agreement (both lender and PPA investor are also lending entities). Currently, the only threat or incentive for timely payment is a non-judicial foreclosure for real property, a judicial foreclosure for real property repossession for personal property or a breach of contract for violating the agreements behind a PPA. Traditionally, foreclosure and/or repossession require taking possession (physically) of the collateral in question. These procedures, however, are time consuming and costly. For matters involving personal property, a creditor may repossess (also known as self-help) described collateral from a consumer without resorting to the courts as long as it does not involve breaching the peace. The Uniform Commercial Code (U.C.C.) Article 9 regulates the manner in which secured creditors exercise self-help repossession to recover collateral (goods) after a default. Some states have enacted statutes governing notice requirements in consumer credit transactions that may require the creditor to send notices in connection with repossession.

For certain types of personal property such as automobiles, there exists a method or mechanism by which a creditor may increase his/her chances of receiving payments under specific financing arrangements. The method or mechanism involves a starter interrupt device. Passtime Corporation and Payment Protection Systems, Inc. (See passtimeusa.com and ppsontime.com) are companies that offer such devices. Such devices are used in automobile financing or leasing agreements to ensure repayment. A starter interrupt device merely prevents an owner or lessee from starting a vehicle until he/she has made an incremental payment. The device functions to "interrupt" electricity flow from vehicle starter to its ignition (making the vehicle inoperable). There are different types of starter interrupt devices. The more simple devices use activation codes to permit vehicle use. A creditor supplies the codes after the creditor receives a periodic payment from the owner/lessee. More sophisticated devices incorporate GPS tracking technology and other features. U.S. Pat. Nos. 6,195,648, 6,828,692, and 6,870,467 are examples of vehicle interruption devices/systems. The advantage of using a starter interrupt devices is there is generally no interaction between creditor (and its agents) and the consumer when the device is used. A direct confrontation with the consumer is therefore minimized. Consequently, the devices appear to reduce the likelihood of a breach of the peace. State law ultimately determines permitted use and operation.

Without the use of a starter device or other means to access personal property remotely such as the PV system (that is subject to financing), a lender will likely require direct access to the subject property to prevent a consumer from using such property until he or she has made the appropriate payments. In order to directly access personal property, a lender may require the permission, power or authorization to enter a consumer's premises (real property) and/or disable the personal property of the consumer to discontinue the use of such personal property.

Utilities, for example, typically have the power and authority to enter the premises of a consumer and access the power equipment and/or discontinue power supply in the event that a consumer has failed to make a payment (utilities are required to follow rules set forth by the State PUCs concerning shut-off). Such power and authorization is provided in the published tariff agreements between a utility and consumer for power supply. The threat of utility service shut-off provides a real incentive to make timely payments to a lender. The same incentive holds true for the other companies including the telephone company. However, lenders currently do not have the power and authorization, like a utility, to enter a consumer's premises and access personal property such as renewable energy CPE under the existing financing arrangements between lender and consumer.

In short, starter interrupt devices appear to be quite advantageous for a creditor involved in a vehicle financing arrangement. However, there are currently no devices, systems or methods used to enable the lender (e.g., creditor, PPA Investor) under a financing agreement for renewable energy equipment to increase the likelihood of receiving payments from a consumer. Further, there is no means by which a lender has authorization to access the renewable energy consumer premises equipment in the event a consumer fails to make a period payment under the financing arrangement.

It would be desirable to provide a method, system and/or agreement that would overcome the disadvantages described above.

SUMMARY

A method is disclosed for providing financing for renewable energy consumer premises equipment (CPE) for power generation at a consumer premises. The renewable energy CPE is adapted to deliver power onto the consumer premises and a power grid. The method comprises: providing by a non-utility entity financing for the renewable energy CPE under an agreement between the non-utility entity and a consumer located at the consumer premises, granting the non-utility entity a right to control operation of the CPE and any power generated by the CPE using a shut off control device coupled with the CPE upon default by the consumer under the agreement, the shut off control device configured to control power delivery at the consumer premises including allowing power to flow from the CPE to the consumer premises and the power grid and preventing power from flowing from the CPE to the consumer premises and the power grid; monitoring by a computer to detect a default by the consumer of the agreement; and upon default by the consumer under the agreement, controlling the operation of the renewable energy CPE and any power generated by the CPE by the non-utility entity by means of the shut off control device.

A system is disclosed for increasing the probability of timely receiving payment under an agreement between a consumer and a non-utility entity for providing financing for renewable energy consumer premises equipment (CPE) by the consumer for power generation at a consumer premises. The renewable energy CPE is adapted to deliver power onto a power grid or to the consumer's premises. The system comprises: a computer for monitoring consumer financial information for by the non-utility entity to detect the consumer's financing default in accordance with the agreement, wherein the renewable energy CPE including a PV array and a control device coupled to the PV array for controlling the operation of the PV array and any power generated by the CPE upon a default detected by the computer.

Renewable energy consumer premises equipment (CPE) is disclosed for power generation at a consumer premises. The renewable energy CPE is adapted to deliver power onto a power grid or to the consumer's premises. The renewable energy CPE comprises: a PV array; and a control device coupled to the PV array for controlling the operation of the PV array and any power generated by the CPE upon a default detected by the consumer for the power generated by the PV array.

BRIEF DESCRIPTION OF THE DRAWINGS

The accompanying drawings, which are incorporated herein and constitute a part of the specification, illustrate embodiments of the invention, and together with the general description given above and the detailed description of the embodiments, serve to explain the principals of the invention.

FIG. 2 illustrates a block diagram of a power system incorporating consumer premises equipment (CPE) for a real property structure.

FIGS. 2A-B illustrates net and dual metering arrangements, respectively.

DETAILED DESCRIPTION OF THE INVENTION

Figure 1:
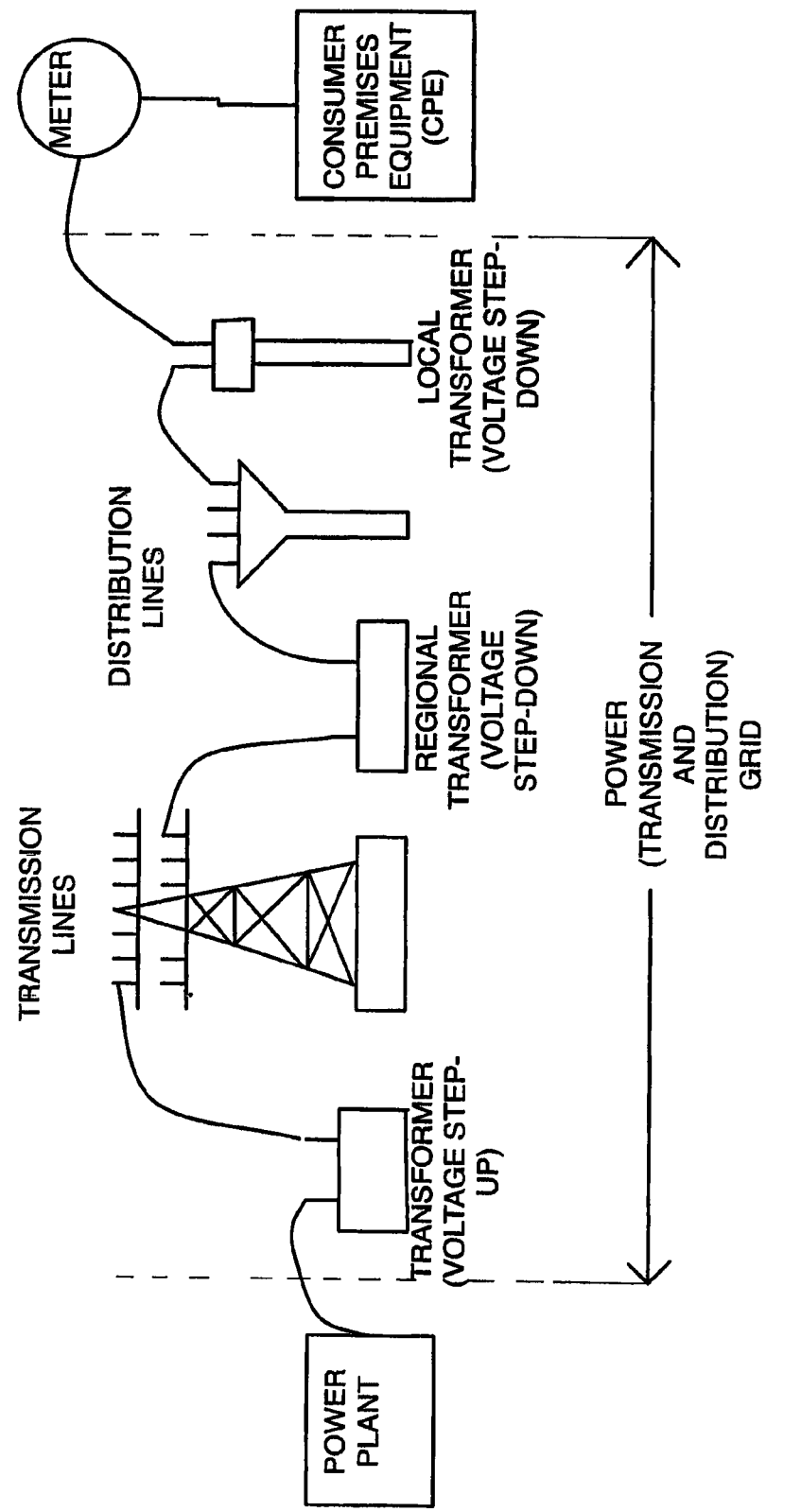
FIG. 1 illustrates a diagram of a prior art power system.

FIG. 1 is described above. FIG. 2 illustrates consumer premises equipment 10 (also known or referred to as "CPE," "consumer premises equipment," "renewable energy consumer premises equipment" and "renewable energy CPE") that resides on a residential building, but may alternatively reside on a business, institution or other real property. It is noted that many of the terms used in this application are defined herein (including the Appendix), and such definitions (meaning) shall control in any conflict or inconsistency with a conventional definition or meaning provided in any priority or other application or document. According to the embodiment of FIG. 2, CPE 10 incorporates renewable energy equipment that is used by the consumer for energy generation. In this embodiment, CPE 10 includes solar components as the renewable energy equipment (source). Alternatively, any renewable equipment may be used such as wind, biomass or water (hydroelectric) energy generation equipment as well as non-renewable energy sources.

The solar components described herein are collectively known as photovoltaic ("PV" or "solar") equipment (or system). In general, there are two types of PV systems: systems that interact with the utility power grid with no battery backup capability and systems that interact with the power grid and include battery backup. In addition, there are other systems that do not interact with the grid. In the embodiment shown in FIG. 2, the PV system (equipment) interacts with the power grid 32 but does not include a battery backup. As a result, this system operates only when the utility is available. This PV system will typically provide the greatest amount of savings to a consumer per dollar of investment. However, the system will shut down during an outage, and will remain that way until utility power is restored. Note that the consumer is a homeowner or resident for this discussion, but may alternatively be a business, institution, entity or other user or purchaser of power (electricity).

CPE 10 comprises several components including a PV (photovoltaic) array 12 along with the appropriate mounting equipment. PV array 12 is made up of PV modules, which are environmentally sealed collections of PV cells. These cells convert the sunlight into electricity. One of the most common PV modules is 5-25 square feet in size. Usually four or more smaller modules are framed together by struts called a panel. A panel spanning 20-35 square feet in area may be used for more easily handling on a roof. CPE 10 includes mounting and wiring systems used to integrate the solar modules into the electrical systems of a residence or alternatively a business, institution or other consumer.

CPE 10 includes (as part of the wiring system) PV array circuit combiner 14, ground fault protector 16, DC fused switch 18 and DC/AC inverter 20 connected in series. PV array circuit combiner 14 is connected to PV array 12. DC fused switch 18 is used as over-current protection for the solar (PV) modules. Ground fault protection 16 is a circuit breaker. Combiner 14 is used since PV array 12 (modules) requires fusing for each module source circuit. Some inverters alternatively include the fusing and combining function within the inverter housing. Inverter 20 is designed to take the DC power from PV array 12 and convert it into standard AC power used by devices that consumes standard AC power.

CPE 10 further includes AC fused switch 22 and utility switch 24 connected in series (and connected to DC/AC inverter 20). AC fused switch 22 is used as a power disconnect (i.e., as an over-current protective device (OCPD)). Utility switch 24 is used by the utility to switch off PV array 12. Most utilities require a visible-blade, lockable open switch or disconnect in the inverter's output circuit. The utility switch 24 is usually located within sight of the service-entrance meter for ease of locating by emergency response people. It should be noted that CPE 10 may include additional components or fewer components than described herein depending on power and installation requirements. In addition to the above shut off mechanisms (e.g., switches), power shut off may be accomplished by disconnecting the leads of the power grid from the CPE and capping such leads to ensure the safety of those near the power leads.

The components of CPE 10 are connected to original components including main service panel 26, consumer loads or usage (or consumption) 28, meter 30 and a local segment of the utility power grid 32. Specifically, utility switch 24 is fused and is connected to main service panel 26. The maintenance service panel 26 includes among other things the residential circuit breakers. Main panel 26 is coupled to the residential wiring and loads 28.

Meter 30 is coupled between power grid 32 and main service panel 26. Meter 30 is a device for measuring electricity consumption. In this instance, meter 30 is capable of net metering (or other alternative metering schemes discussed below). This is shown in FIG. 2A. CPE 10 is shown interconnected to power grid 32 to enable the consumer to feed any surplus or excess power (electricity) to grid 32. Meter 30 will spin forward when power (electricity) flows from power grid 32 into the residence and backward when CPE 10 (solar components) produces surplus electricity that is not immediately used. Excess power (electricity) is "loaded" on power grid 32. In short, as described herein, CPE 10 is adapted to deliver power onto the consumer premises and the power grid.

Utilities may require an agreement for consumers to qualify for net-metering. This is known as net metering to those skilled in the state of the art. In certain embodiments (similar to embodiments shown in FIG. 2A herein, there might be two separate meters as shown in FIG. 2B. In FIG. 2B, meter 36 and meter 38 are shown in series. Meter 36 is used as a measuring device for power consumed or used and meter 38 is used as a measuring device for power generated by the consumer's CPE. This "dual metering" convention may be desired by a consumer or required by a utility. This is because in some cases, the purchase price of power is different than the rate the utilities buy the power from the consumer.

The solar components or equipment of CPE 10 that is subject to or may be borrowed against (may be secured) includes PV array 12, circuit combiner 14, ground fault protector 16, DC switch 18, DC/AC converter 20 and possibly other components including the mounting equipment. Note that these components may be considered fixtures depending on implementation and local laws.

In the embodiment shown in FIG. 2, there are additional components used to shut off power in the event a consumer fails to make an incremental payment to a lender. To this end, shut off device 23 is coupled between utility switch 24 and main service panel 26. Shut off device 23 (also known as shut off control device or control device) has two functions. First, shut off device 23 (under control) may be used to prevent a consumer from consuming electricity (by way of consumer loads 28). Second, shut off device 23 may also be used to prevent a consumer from generating electricity (from CPE 10) and delivering it onto power grid 32. In addition to shut off device 23, there is another component used to interrupt power. That device is shut off device 27, and it is coupled between main service panel 26 and meter 30. A utility or its agent may use shut off device 27 to shut off power supplied to the consumer. Shut off devices 23 and 27 may be a local device such as a switch or similar component or a device that is remotely controlled. The switch or similar component may be mechanical or electronic wherein codes may be entered (for example) for continued operation. As indicated above, shut off devices 25 and 27 may be remotely controlled by wired or wireless communication (coupling with control source 29). Conventional wireless communication includes satellite, radio (e.g., UHF/VHF) and cellular technology.

Whether wired or wireless communication (remote) is used, shut off (using devices 23 and 27) may be accomplished by deactivation or reactivation. With deactivation, CPE 10 is shut off when appropriate codes are sent. The lender may send such codes when the consumer fails to make an incremental payment by a default cure date set forth in a written notification sent to the consumer. With reactivation, CPE 10 automatically shuts off and cannot generate power until control device 29 sends a reactivation codes. The lender shall send such codes when the consumer makes an incremental payment by a default cure date. A utility may also shut off power supplied to the consumer under similar circumstances (as provided in the agreement between lender/creditor and consumer). This is described in more detail below.

Shut off device 27 may be used to interrupt/shut off (1) electricity supplied to the consumer and (2) electricity generated by CPE 10 and delivered onto power grid 32. In this configuration, shut off device 27 may prevent electricity from flowing toward grid 32. However, in this configuration, shut off device 27 is not capable of preventing a consumer from consuming electricity (via consumer loads 28) generated by CPE 10. For this purpose, shut off device 23 is used. If a configuration incorporates control source 29 for shut off (as opposed to a switch), control source 29 may remotely control and shut off device 23 to cut off power consumed by consumer loads 28. It is noted that there may be many other types of shut off and controlling components and configurations to achieve power interruption.

Now, if a lender (under an arrangement as discussed below) desires to shut off power generated by the CPE in accordance with an embodiment of the present invention, a lender may do so in several ways. As indicated above, a lender may use control source 29 to control the operation of shut off devices 23 and 27. In addition, either DC fused switch 18 or AC fused switch 22 may be "switched" or disconnected to stop power generation and delivery. In addition, DC/AC inverter may be removed to ensure that power is not generated and consumed or delivered onto power grid 32. There may be other switches or components that may be incorporated into CPE 10 or outside of CPE 10. For example, a switch may be used between meter 30 and main service panel 26. Any switch discussed may have a locking or key mechanism in place to prevent unauthorized "turn on" or "shut off." If a lender desires to shut off utility power as authorized by a consumer under an agreement (discussed below) or a utility desires to shut off supplied power on its own volition, shut off device 27 may be used to cut off supplied power.

Figure 3:
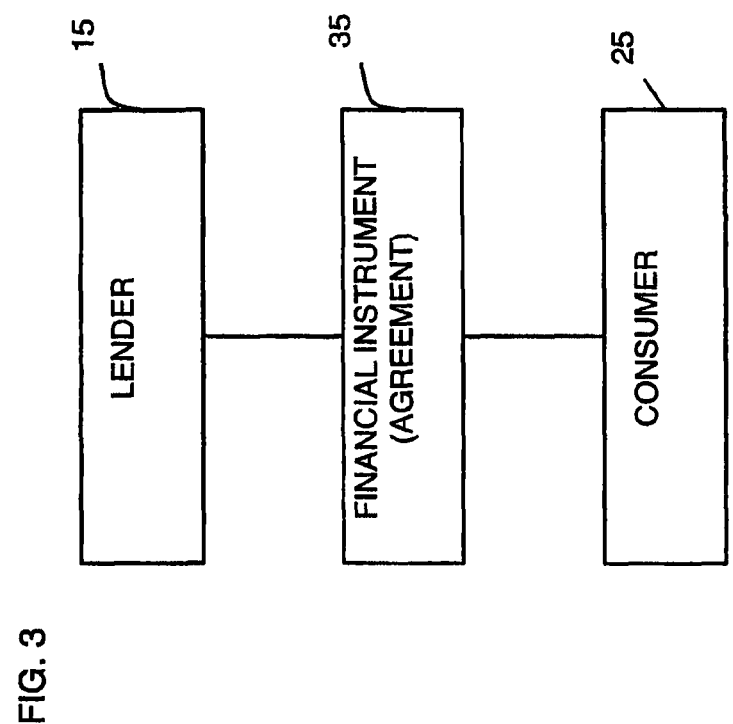
FIG. 3 illustrates a block diagram of an agreement between lender and consumer/borrower in accordance with an embodiment of the present invention.

Reference is made to FIG. 3 wherein an arrangement, i.e., an agreement between the lender 15 (also known and referred to herein as "creditor," "vendor" and "PPA Investor") and consumer/borrower 25 for financing consumer premises equipment (CPE) is shown. The lender is likely a non-utility entity in the business of financing personal property and/or real property. Utilities are not in the business of financing (i.e., lending). The relationship is commemorated or represented by a written contract such as financial instrument 35 in accordance with an embodiment of the present invention. Financial instrument 15 may take many forms including, without limitation, a power purchase agreement (PPA). The agreement or relationship may alternatively be represented by any other legal arrangement (in accordance with the present invention) between a financing entity and a consumer to achieve the same result. Regardless of the type of arrangement, the agreement must abide by applicable State and Federal law.

Examples of such State laws include the Uniform Commercial Code (UCC) and the Uniform Computer Information Transactions ACT (UCITA). With respect to the UCC, power shut off may constitute a form of self-help repossession under the Uniform Commercial Code (UCC). Under Article 9 of the UCC, the law provides creditors who have secured a loan (with a consumer) against certain designated collateral (goods) the right to seize the collateral in the event the consumer defaults on the loan without resorting to the judicial system. In addition, the use of self-help repossession in a software context (e.g., embedding the licensed software with code to disable use) may also be governed by sections 814-816 of UCITA (depending on the State). Sections 814-816 enable small and medium-sized licensors of software to enforce their contractual rights quickly and efficiently without resort to judicial process. Today, only Maryland and Virginia have adopted this Act (applicable UCITA sections are based on proposed Section 2B of the UCC which ultimately was not passed into law). State law dictates the rules and regulations of shutting off power (whether manually or electronically performed). Most States also have laws relating to consumer credit. Examples of such Federal laws may include "The Truth in Lending Act," "Equal Credit Opportunity Act," "Fair Credit Reporting Act" and several other Federal laws.

Financial instrument 35 shall include several provisions or features relating to the transaction between lender 15 and consumer/borrower 25. For one thing, financial instrument 35 shall include a provision (i.e., language) describing the collateral against which the loan is secured. Collateral may be a power proxy, personal property or real property (See Appendix). For example, collateral may be CPE 10, rebates, credits, subsidies, and/or the real property upon which CPE 10 is disposed. These are examples of collateral. As stated above, the financing of the CPE is secured against collateral such as receivables (power proxy element). Receivables as defined in the Appendix include payment for the value of the power generated by the CPE. Financial instrument 35 shall also give the lender 15 the authority to foreclose or make a claim to the collateral in the event the consumer defaults on the loan or breaches the agreement in other ways. For purposes of this application, the term "provision" shall mean any portion, text, section or language of an agreement between a consumer and lender for financing CPE. The terms "provision" and "section" are used interchangeably in this application. When discussing a provision of the agreement between the lender and consumer herein, the provision may be in the body of the agreement, or alternatively, it may be set forth in an attachment to the agreement. In this respect, the agreement shall incorporate the attachment by reference therein.

In particular, when a consumer fails to make a loan payment (for example) by its due date, is in non-financial default of the loan agreement (for example not paying for insurance), or alternatively, when a consumer fails to pay a PPA payment by its due, a "default" typically occurs. In general, a default is a legal term that means the failure to make a payment when due, which can lead to a notice of default and the start of foreclosure proceedings if the debt is secured by real property or a repossession if secured by personal property. However, default shall also include any breach (violation) by the consumer of one or more provisions or conditions of the contractual arrangement between the lender and consumer (e.g., a PPA or other legal arrangement). An example of this is a consumer's failure to maintain insurance coverage on the CPE as required by the agreement. The agreement will determine what ultimately constitutes a default. In addition, State law may provide limitations on a default provision in the agreement.

In many legal arrangements, consumers may have the right to "cure" a default. State law also may require the right to cure. For example, Title 9-A, Sections 5-110 and 5-111 of Maine's Consumer Credit Code provides a right to cure for a default based on the consumer's first failure to make a required payment under a consumer credit transaction. Under Sections 5-110 and 5-110, a creditor may neither accelerate maturity of an unpaid balance of the obligation, nor take possession of or otherwise enforce a security interest in goods that are collateral until fourteen days after a notice of the consumer's right to cure is sent, as provided in section 5-110. Many States laws prescribe detail steps with respect to consumer credit, default, notification and collateral repossession.

In the event a right to cure a default is conferred by agreement and/or State law, the lender will notify the borrower of the default (or missed payment depending on required language) and afford the borrower the opportunity to cure the default within a period of time. This notification may include other information including the specific clause breached and/or State law requiring such notification. Notification will likely be in written form, but could be sent by email or other communication recited in the agreement or required by State law.

In order to cure a default as indicated above, the consumer must "fix" their breach/violation of their legal obligations under the financial instrument (including a PPA) or other contractual arrangement. In the event a consumer fails to make a payment for example, the consumer may cure the breach of contract by tendering to the lender/creditor the missed loan payment (plus any late fees as required by the loan) or power purchase payment under a PPA. If cure is specifically provided (under the contract or State law), a financial instrument (including a PPA) or other contractual arrangement usually states a time period in which the consumer (or borrower) may cure the default. If the consumer does not cure in accordance with the loan agreement (financial instrument) and/or State law, the lender must decide how to obtain the money it is owed or to fix a non-monetary default. Typically, enforcement of a loan upon a default is done by foreclosure (usually refers to real property) or repossession (personal property). Under a PPA, there is no such thing as foreclosure or repossession. However, a "remedy" is likely provided in the agreement. For purposes of this application, a remedy in a PPA is treated the same as a foreclosure or repossession. Foreclosure is a method of enforcing a security interest in property. Repossession is another method of enforcing a security interest in personal property (depending on state law). The lender may have other remedies prescribed in the agreement and/or by State law (e.g., UCC). Foreclosure, however, is expensive and time consuming. For this reason, the financial instrument 35 (including PPA) or other legal financing agreement shall include provisions permitting the lender to (1) enter the consumer's premises (by way of an easement or license), (2) inspect CPE 10 and/or act upon CPE 10 including shutting the power off of (using shut off device 23 for example) and possibly shutting off power supplied to a consumer by a utility using device 27). This is discussed in detail below with respect to FIGS. 3 and 4.

Returning to FIG. 3, in summary, financial instrument 35 shall also include one or more provisions or language describing the loan amount, the interest rate, what constitutes a default, the rights of the lender 15 (creditor) and consumer upon default including shut off remedies, maintenance of CPE 10, insurance for the equipment and/or other terms. In addition (as described above), financial instrument 35 shall also include a provision(s) or language granting an easement or license to enable lender 15 or its agent to enter the real property of the consumer/borrower 25 and to act upon CPE 10 in some way (shut off, inspect, modify CPE 10 as described below). An easement (the one herein discussed is historically called easement in appurtenant or covenant) is a legal right or restriction that attaches to the property in which CPE 10 is disposed.

In this respect (i.e., easement), lender 15 may enforce his right to enter the real property against all who own or lease the real property on which the CPE 10 is disposed (particularly if the loan agreement (or PPA) is transferred to the new owner or lessee). It is not a personal right or restriction that cannot be transferred (i.e., the personal right or restriction typically extinguishes when the real property is sold to another). As described above, the provision with the easement may be in the body of the agreement between lender and consumer or may be part of an attachment incorporated by reference into the agreement. Under state law, it is likely that such as easement must be recorded with the appropriate state governmental recording agency.

In another embodiment, the easement may additionally or alternatively grant the lender 15 a right to continue operation of the CPE 10 on the real property of the consumer/borrower 25, in the case of default and/or repossession of the CPE 10. This provides the lender 15 an ability to continue generation of power and direct it onto a power grid or another location or storage facility/unit. Thus, CPE 10 may generate revenue even in the case of default and/or repossession of the CPE 10.

As an alternative to an easement, financial instrument 35 may provide a license granting the right to enter the real property of consumer 25 and act upon CPE 10. Typically, licenses to enter property, however, are personal and do not run with the land. Therefore, the easement is more advantageous to lender 15. Whatever the mechanism is used to grant property entry and access to CPE 10 (e.g., easement, license or other ingress rights), financial instrument 35 (including a PPA) or other arrangement shall set forth the length of time in which lender 15 shall have the right to access the property. In most cases, the right shall extend for the loan period or other period in which payment must be made (e.g., PPA periodic payments for power generated by CPE 10).

It should be noted that the agreement (financial instrument 35 including PPA or other arrangement) shall grant access to enter the consumer's real property (premises) even if the lender expects to remotely shut off a consumer's power (in the event of default). Property access will permit lender 15, upon its sole discretion, to inspect CPE 10 and either modify CPE 10 or instruct the consumer to make such modifications, as required by financial instrument 35. This will ensure that CPE 10 will optimally generate power during the course of the arrangement between lender 15 and consumer 25 (until lender determines otherwise in accordance with the agreement and/or State law).

As part of the agreement, lender 15 shall require that consumer 25 execute any additional legal real property documents necessary to enable lender 15 to secure the easement or other legal rights (to enter the property) and to perfect such rights against third parties. Such documents may require notarization. In order to perfect such security document, lender 15 shall typically file such documents (e.g, easements) at the government recordation office in which the real property is located. The appropriate governmental office may be a county recorder's office, Secretary of State or department of corporation's office. However, State law ultimately governs recordation procedure and filing.

As indicated above, financial instrument 35 shall include a provision(s) or language granting lender 15 the right to (1) inspect the CPE 10, (2) remove the CPE 10, (3) shut off (also known as disconnected, interrupted or "intervention") power locally or remotely generated by CPE 10 based on specified breaches (violations of financial instrument 35) and/or (3) modify and maintain the CPE 10 to ensure maximum power generation. In the event lender 15 decides to shut off consumer power under the agreement, lender 15 shall notify consumer 25 and give a certain period to cure the breach of agreement to avoid shut off. Financial instrument 15 will likely require such notification (even if State law does not require it).

In addition, the provisions described herein granting rights to enter the consumer premises and act upon or control the CPE 10 may apply to agents (or other third parties such as the trustee in a deed of trust) acting on behalf of lender 15 including installers, inspectors or other entities instructed to perform services for lender 15. These agents granted such rights may also include a utility, as a third party beneficiary, supplying power to consumer 25. In this respect, the utility would have the right (and may be required as authorized in the agreement between lender 15 and consumer 25) to enter the property and/or to shut off power (i.e., power intervention or interruption) supplied to the consumer by the utility (for breaches of the agreement between lender 15 and consumer 25).

In the event a consumer defaults and financial instrument 35 grants lender 15 the right to force a utility to shut off power, financial instrument should reference and possibly incorporate the utility agreement (between consumer and utility). Financial instrument 35 shall also require that lender 15 to follow the rules and requirements of such utility agreement with respect to power discontinuance. PG & E of California, for example, has a tariff agreement in which power discontinuance rules are prescribed. See domain page at pge.com/tariffs/ER.SHTML#ER. This agreement is incorporated herein by reference.

Financial Instrument 35 shall also include a provision or section requiring the consumer to notify lender 15 if for legal reasons why lender 15 shall not shut off power in the event of a default by the consumer. For example, a consumer may legally require life support equipment to stay alive. Such equipment requires power for operation. Lender 15 may check a consumer's meter tags (indicating that power must not be shut off) and/or the utility company database for people on life support. Such provisions may require a lender to check a consumer's meter tags and/or check the utility company database for people on life support. See PG&E's Service for Medical Baseline and Life Support Customers. (See domain page at pge.com/res/financial_assistance/medical_baseline_life_support/) In addition, the agreement provision or section may provide a specific email, postal or other address to which the notification shall be sent.

Financial instrument 35 may also include a provision or section with a power of attorney. This power of attorney will govern communication between the consumer 25 and the utility, relevant State PUC and possibly other entities. The language may state that this power of attorney is irrevocable. Note that State law ultimately governs such provisions.

While the discussion above pertains to a financial instrument involving a loan, the contractual provisions or language pertaining to the right to enter the property (e.g., easement) and the right to act upon CPE 10 (e.g., interrupt CPE functions, inspect CPE and modify CPE, etc.) may be included in any other legal agreement between the parties concerning the purchase of power generated by the CPE 10, or lease or use of CPE 10 to generate power. In the event that power interruption or shut off is the desired action by any authorized party under any contractual arrangement, power may be interrupted or shut off locally or (alternatively) remotely. If action is performed locally, lender 15, its agent or any contractually authorized party may enter the property to perform the task mechanically (using shut off devices 23 and 27). For example, shut office devices 23 and 27 may be a key or switch to interrupt power. Alternatively, lender 15 may remove inverter 20 or any other component provided such removal does not damage CPE 10 or the real property on which CPE 10 is positioned. (It should be noted that power might be shut off for safety reasons.)

In the event interruption or shut off is to be performed remotely, lender 15 may achieve this goal electronically by wire or wireless connection as described above (using shut off devices 23 and 27). For example, lender 15 may interrupt or shut off power by means of a codes/software deactivation or reactivation. Specifically, CPE 10 purchased (or used or leased under a PPA) by consumer 25 may include software under license to consumer 25. If consumer 25 fails to make a loan payment (or other default as described herein), lender 15 (agent or another authorized to act on its behalf such as a vendor) may deactivate CPE 10 remotely (traditionally via software execution). Alternatively, such software may require periodic reactivation codes or keys to enable consumer 25 to continue to use CPE 10 to generate power. In the event consumer 25 fails to make a loan payment, consumer 15 will not receive reactivation codes until consumer 25 cures the breach.

Financial Instrument 35 (such as a PPA) or any other agreement between the consumer and lender for financing renewable energy CPE will not only be executed by the parties, but will likely be also be notarized. Alternatively, lender 15 may use a medallion guarantee to guarantee financial instrument 15 from forgery. (In the United States, a medallion signature guarantee is a special signature guarantee for the transfer of securities. It is a guarantee by the transferring financial institution that the signature is genuine and the financial institution accepts liability for any forgery. Signature guarantees protect shareholders by preventing unauthorized transfers and possible investor losses. They also limit the liability of the transfer agent who accepts the certificates.) In addition, execution of the agreement (i.e., the transaction) may be evidenced by electronic recordation including videotape or other means of proof.

Figure 4:
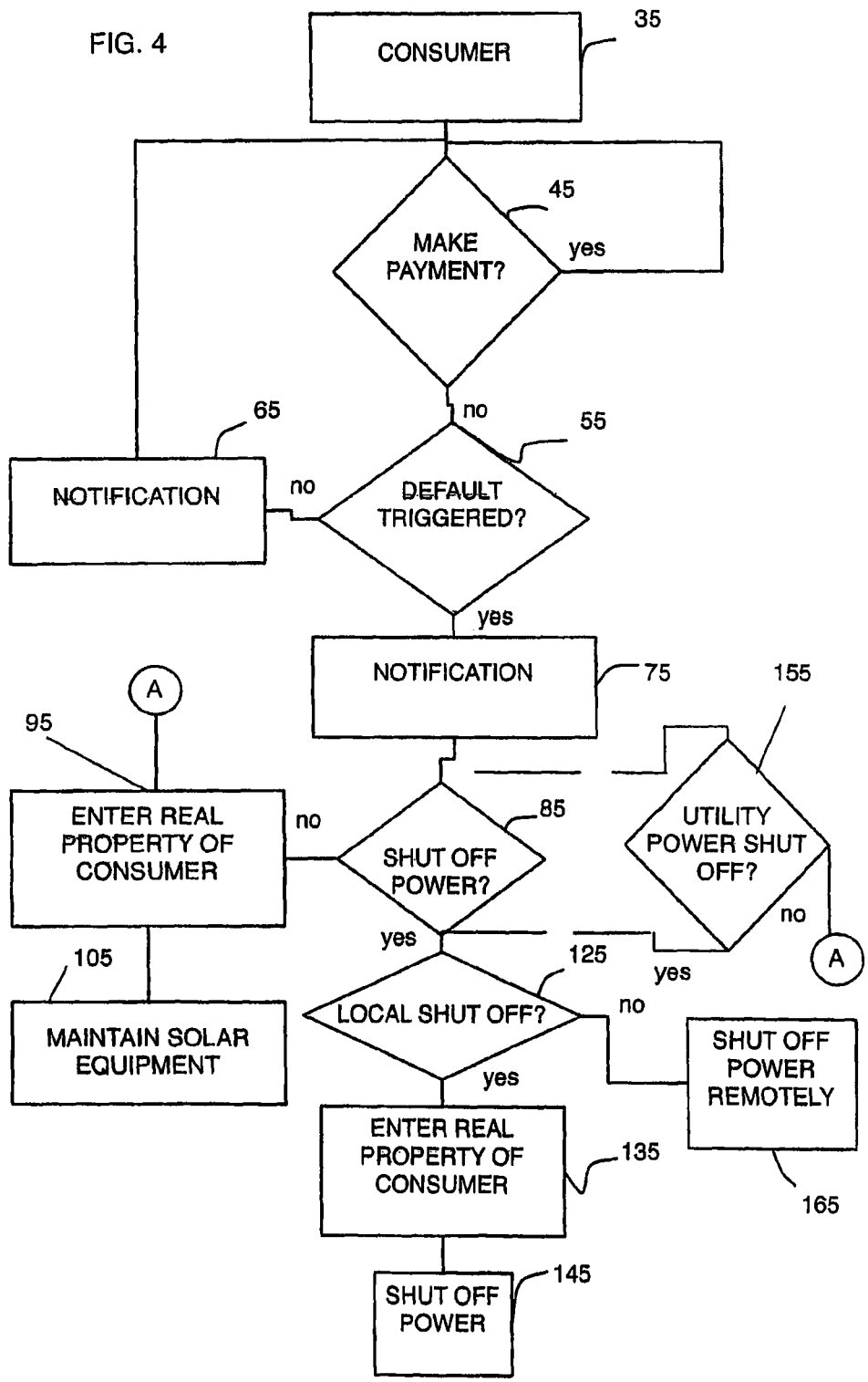
FIG. 4 is a flowchart illustrating the steps of the method for contemplating shutting power off upon default in accordance with an embodiment of the present invention.

Reference is now made to FIG. 4 wherein a flowchart is shown that illustrates the steps of a method for either shutting off or maintaining power generation on a consumer's premises (real property). In this method, it is presumed that a lender has provided a loan to a consumer for the purchase of CPE 10. In the normal course of any financing mechanism or process, consumer 25 will make payments to lender 15 on an incremental basis. Terms typically require monthly payment increments but any period may be required. Payments are shown at step 35. Execution then moves to decision step 45 wherein it is determined whether consumer 25 has made the relevant incremental payment. If the consumer has made the relevant payment, execution returns to step 45. If consumer 25 fails to make a payment, consumer 25 is in default for failure to make the appropriate incremental payment. Execution moves to decision step 55 wherein it is determined if consumer's failure to make a payment has triggered a default-remedy provision under the terms of financial instrument 35. Such a provision will be triggered if notice is provided to consumer 25 with appropriate information and cure date.

If a default-remedy provision is not yet triggered, lender 15 shall notify consumer 25 at step 65 of the failed payment, (2) the default provision breached, (3) the deadline in which payment must be received (cure date), (4) the location in which payment must be delivered or sent and (5) the remedies provided under the agreement and State law that lender may use to enforce the agreement. There may be other information set forth in the notification.

Now, if consumer 25 failed to make the payment by the cure date, lender 15 shall notify consumer 25 that consumer 25 is in default, consumer 25 has breached the agreement by his/her failure to make payment by the cure date, the default-remedy provision(s) of financial instrument 35 are triggered and that power generated by CPE 10 may be interrupted or shut off by a specified date, or alternatively the CPE 10 must be continued in operation for the benefit of the lender 15, unless payment is not received immediately. That is, lender 15 may control (i.e., take control) over the operation of CPE 15 and the power generated by it upon a default by consumer 25. This control (or controlling) encompasses interruption, shut off or continued power delivery as desired). At this time, lender 15 has all of the available remedies provided under financial instrument (agreement) 35 as well as under State law.

Execution then moves to decision step 85 wherein lender 15 determines whether it wishes to interrupt or shut off power, or alternatively continue operation for the benefit of the lender 15. If the answer is no, lender 15 may wish to take advantage of other remedies such as garnishing employment wages of consumer at step 95 or alternatively foreclosing on the consumer's property or taking other action to obtain the money to repay the loan. Lender 15 may also enter the property to perform maintenance on CPE 10 to ensure CPE 10 continues to generate power at steps 105 and 115, respectively, for the following reason. Lender 15 may desire to claim the collateral in accordance with financial instrument 35. As indicated above, the collateral may include the CPE 10 for example, the power generated by the CPE 10, the receivables paid/credited by a utility for power generated by the CPE 10 or other property (or other power proxy elements). Alternatively, lender 15 may be receiving payments from utility directly. As indicated, lender wants to ensure that CPE 10 generates power to receive the benefits from that power (e.g., receivables). Lender 15 may have other options against consumer 25 to repay the loan.

In the event the answer to decision step 85 is yes and lender 15 decides to interrupt or shut off power (CPE 10), execution moves to decision step 125 wherein lender decides if it will interrupt or shut off power locally (mechanically). If the answer is yes, lender 15 shall enter the real property at step 135 and interrupt or shut off power at the consumer's premises a step 145. This may be accomplished by switch, component removal or other mechanical or electro-mechanical means. In the event the answer is no to decision step 125 and lender 15 desires to interrupt or shut off power remotely, lender 15 has several options to accomplish this task, but such options will depend on the system components of CPE 10 and the specific provisions (e.g., easements, licenses etc.) of financial instrument 35 and any related documents. As described above, lender 15 may deactivate CPE 10 remotely as described above by sending codes/software (using shut off device 23). Alternatively, lender 15 may not transmit activation codes or keys to ensure continuous operation of CPE 10 (until payment is received). Interruption/shut off may be by wired or wireless communication (remotely). Shut off may, however, be accomplished in many ways (described above).

In addition to the lenders authority to interrupt or shut off power (step 85), a utility may also be authorized (and required) to interrupt or shut off power. This is shown in decision step 155 connected in parallel to step 85 (dashed lines). The utility will also have the choice of interrupting power locally or remotely (steps 125 and 155) as described above depending on the grid connection and system used. The utility may choose not to shut off power, but may wish to enter the real property to access the equipment (for inspection or modification. This equipment may be utility owned equipment or possibly CPE 10.

While the method of FIG. 4 applies to breaches (violations of the agreement) by means of a failure to make payment, any breach of a condition or provision may be cause for property entry and/or power interruption or shut off. For example, any failure to maintain insurance for CPE 10 or pay real or personal property taxes as required by financial instrument 35 may be subject to power shut off. In addition, the arrangement described with respect to the method in FIG. 4 is a financial instrument (e.g., a PPA or other security agreement). However, any legal arrangement may be used for this method including a PPA or any other legal arrangement.

Figure 5:
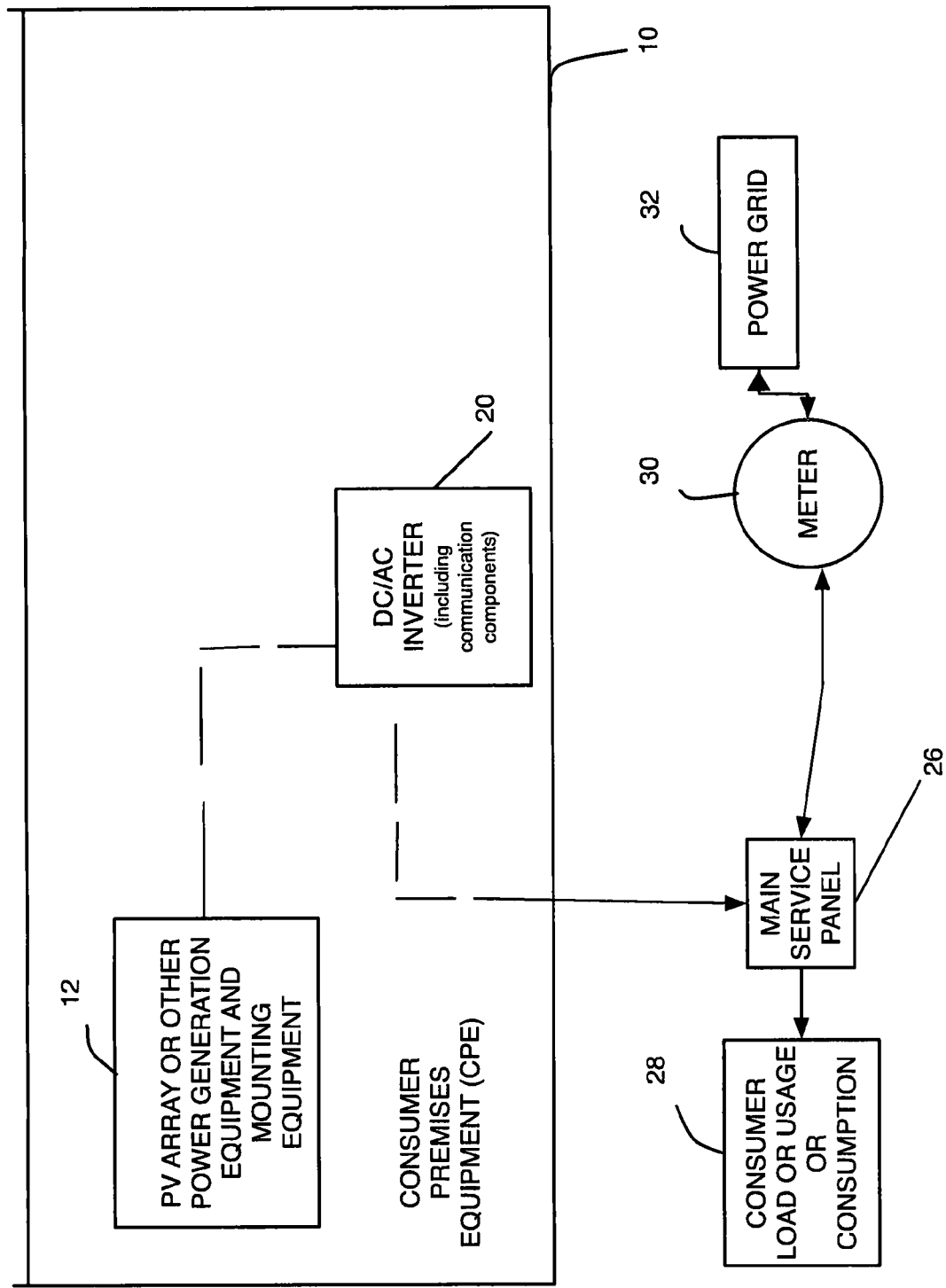
FIG. 5 illustrates a block diagram of a power system incorporating consumer premises equipment (CPE) affixed to or adjacent to a real property structure in accordance with an alternative embodiment of the present invention.

Reference is made to FIG. 5. FIG. 5 illustrates a block diagram of a power system incorporating consumer premises equipment (CPE) affixed to or adjacent to a real property structure in accordance with an alternative embodiment of the present invention. In this FIG. 5, CPE 10 includes PV array 12 and inverter 20 similar to that shown in FIG. 2. CPE 10 may include other conventional components such as circuit combiner 14, ground fault protector 16, DC fused switch 18, AC fused switch 22, utility switch 24 and/or other conventional components as known to those skilled in the art. However, for the purpose of simplicity, FIG. 5 illustrates merely dashed lines (between PV array 12 and inverter 20 and inverter 20 and main service panel 26) that represent these conventional components.

As known by those skilled in the art, inverter 20 performs the conversion of the variable DC output of PV array 12 into clean sinusoidal alternating current of standard frequencies (measured in Hertz). That alternating current is applied directly to power grid 32 or local consumer load 28 or a mixture of both the power grid 32 and local consumer load 28. Inverter 20 includes a processor (e.g., microcontroller) as well as other conventional components. As known by those skilled in the art, the processor has several functions. As one function, the processor(s) or a dedicated chip(s) typically executes an algorithm required to invert the DC voltage generated by the solar module into AC and is programmed to perform the control loops necessary for all power management functions necessary including, but not limited to, DC to DC and DC to AC. In this embodiment shown in FIG. 5, the processor also maximizes the power output from the PV array, any number of algorithms collectively called maximum power point tracking (MPPT). MPPT algorithm in inverter 20 sees the entire power system as a single module. MPPT may alternatively be performed separately by an independent device or by means of a microinverter as discussed below with respect to FIG. 6.

In addition to the above, inverter 20 also includes communication capability so that users can monitor inverter 20 and report on several power and other operating conditions, provide firmware updates, safety modes and control the connection between inverter 20, power grid 32 and consumer load 28. Inverter 20 is thus a "writable" inverter, i.e., capable of being reprogrammed. In a sense, these inverters may be considered smart inverters because they can be controlled. As part of such control, inverter 20 may thus be programmed to shut off thereby disabling or discontinuing the consumer's use of CPE 10 (and/or local consumer load 28). In addition, the power might be directed partially or totally away ("redirection") from CPE 10 (and/or local consumer load 28) to power grid 32. In this respect, the embodiment of inverter 20 itself acts as a "shut off device" much like the shut off devices 23 and 27 described above. Shut off may be performed locally or remotely depending on the communication technology used. Shutoff might be a physical switch that is manually changed. Depending on the grid infrastructure/connection, wired or wireless options may be used to implement shut off. Communication may be performed by means of wired connection such as a serial connection (RS-232/485, if such communication interfaces are incorporated in inverter 20), CAN transceivers, Power Line Communications (PLC) or Ethernet or by means of a wireless connection such as Bluetooth, ZigBee, WIFI or other wireless communication. These are only examples of the means of communication. Those skilled in the art will know, however, that other technology may be used to achieve such communication. In short, inverter 20 may be shut off with access or possession of the proper protocols regardless of the method used for communication for such shut off. Several manufacturers market inverters with various protocols for communication. For example, SMA, Xantrex, Solectria, PV Powered, Fronius, Enphase and many others market inverters with various codes or commands for accessing such inverters for proper communication. Others may use a standard known as MODBUS and Lon Works.

Importantly, lender 15 may act, pursuant to a default of financial instrument 35 in accordance with the methods described hereinabove, to cause inverter 20 to switch off, i.e., shut off to disable consumer 25 from using CPE 10 to generate power. Lender 15 will possess the proper communication protocol (which may be encrypted) for accessing inverter 20 to control the operation of inverter 20. Shut off may be implemented via inverter 20 by any of the means described herein or other known to those skilled in the art. (Note that the control device used by lender 15 is not shown in FIG. 5.) Alternatively, inverter 20 may be designed to allow lender 15 to prevent consumer 25 from using power generated by CPE 10 but permit, i.e., redirection of power onto power grid 32 or directed anywhere else as desired (and properly wired for this).

Figure 6:
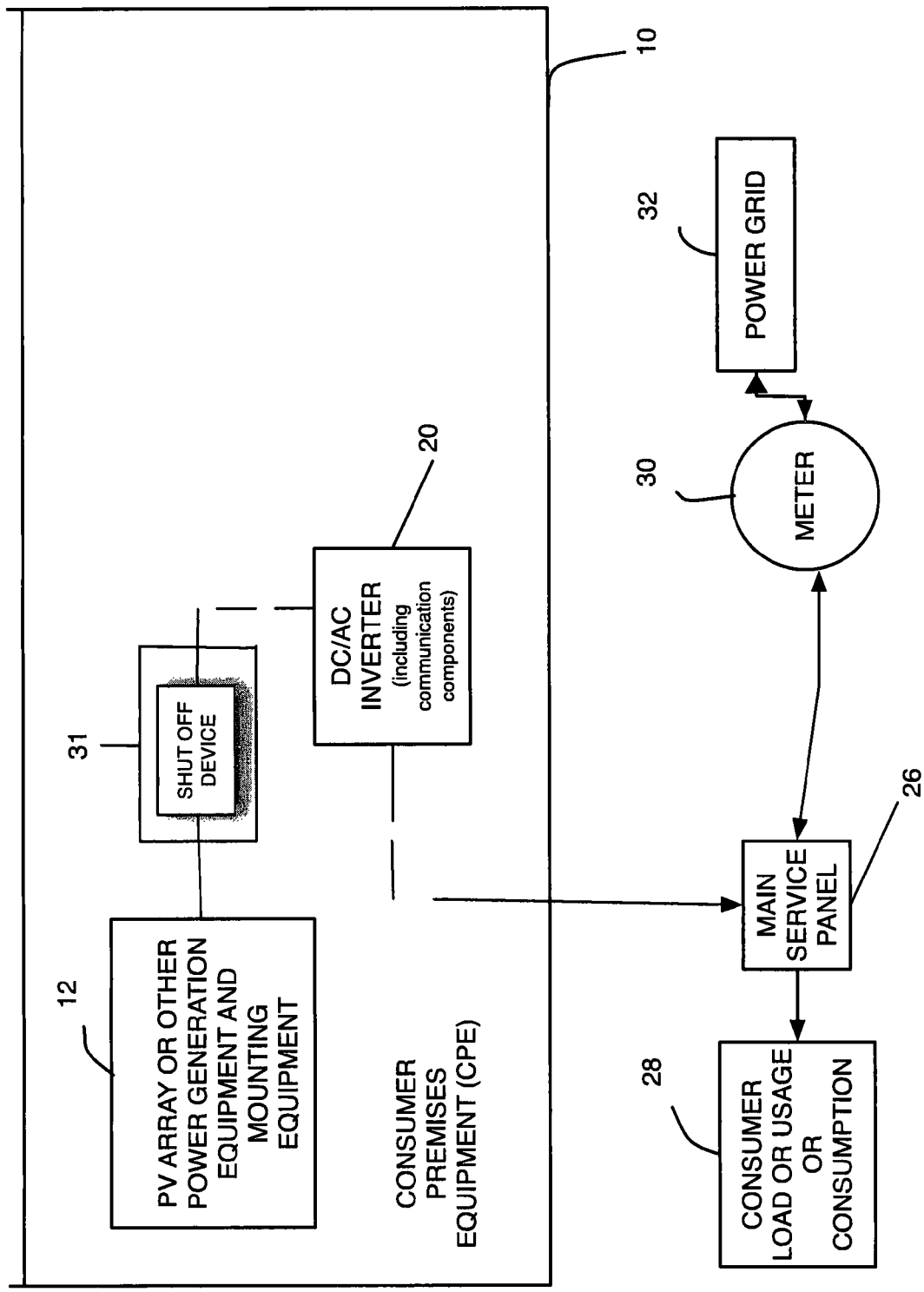
FIG. 6 illustrates a block diagram of a power system incorporating consumer premises equipment (CPE) affixed to or adjacent to a real property structure in accordance with another alternative embodiment of the present invention.

FIG. 6 illustrates a block diagram of a power system incorporating consumer premises equipment (CPE) affixed to or adjacent to a real property structure in accordance with another alternative embodiment of the present invention. In FIG. 6, CPE 10 is shown and it has similar components as shown in FIG. 5 (including those represented by the dashed lines) except that CPE 10 includes a separate component, i.e., component 31 between inverter 20 and PV array 12, that performs the shut off functionality similar to shut off devices 23 and 27. In particular, although component 31 is shown as a single box in FIG. 6, component 31 actually represents several devices, one for each solar module of PV array 12. Each component 31 includes a shut off function as well as, in one embodiment, MPPT. Alternatively, inverter 20 and component 31 may be replaced by conventional components known as microinverters (not shown). In this embodiment, CPE 10 has several microinverters, one for each PV module. Each microinverter would perform the function of an inverter as well as shut off functionality (in addition to MPPT). Communication may be achieved by the methods described above (e.g., Ethernet, PLC, WIFI, ZigBee etc.). The same effect could be true if using device known as a power optimizer marketed by National Semiconductor's Solar Magic or a similar device instead of microinverters.

The foregoing description of the embodiments of the invention has been presented for purposes of illustration and description. It is not intended to be exhaustive or to limit the invention to the precise form disclosed and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

APPENDIX

Terms and Definitions

"cash flow" shall mean a revenue or payment stream that changes a cash account over a given period. Cash flow can also be defined as the monetary value of the power generated by the CPE over a specified period of time.

"collateral" shall mean any property or asset pledged by a borrower to secure a loan or other credit, and subject it to seizure in the event of default.

"consumer" shall mean a user or purchaser of power (electricity).

"computer implementation" (also known referred to "computer implemented") shall mean the execution of any or all process steps by computer. A computer typically includes a processor, memory such as ROM or RAM, storage device such as disks and/or DVD/CD-ROM drives, network card, an operating system such as Microsoft Windows or Apple Snow Leopard and other conventional components.

"consumer premises equipment" (also known or referred to as "CPE," "consumer premises equipment," "renewable energy consumer premises equipment" and "renewable energy CPE") shall mean the physical assets of the CPE such as any and all renewable energy equipment that resides (or is disposed) on or near a residential building, business, institution or other real property. CPE shall include solar components as the renewable energy equipment (source) and any and all mounting equipment. Alternatively, CPE may include any other renewable equipment such as wind, biomass or water (hydroelectric) energy generation equipment as well as non-renewable energy sources.

"credits" shall mean any money or other valuable consideration offered to an entity for certain defined acts.

"deed of trust" shall mean a document which pledges real property to secure a loan by a consumer. The property is deeded by a title holder (trustor) to a trustee (often a title or escrow company), which holds the title in trust for the beneficiary (the lender of the money). When the loan is fully paid, the trustor requests the trustee to return the title by reconveyance. If the loan becomes delinquent or is in default, the beneficiary can file a notice of default and, if the loan is not brought current, the trustee can demand that the trustee begin foreclosure on the property so that the beneficiary may either be paid or obtain title.

"default" shall mean the failure to make a payment when due, which can lead to a notice of default and the start of foreclosure proceedings if the debt is secured by real property or a repossession if secured by personal property. Default shall also include any breach (violation) by the consumer of one or more provisions or conditions of the contractual arrangement (e.g., a PPA or other legal arrangement) between the lender and consumer. An example of this is a consumer's failure to maintain insurance coverage on the CPE as required by the agreement.

"easement" shall mean the legal right or restriction that enables an entity to enter the real property of another entity. An easement attaches to the real property and therefore may be enforced against all who own or lease the real property.

"entity" shall mean any person, group of persons, company, division, agency, partnership or other entity (private or government). Entity includes, without limitation, a consumer, lender or other party such as a non-utility.

"financial instrument" shall mean any real or virtual document representing a legal agreement involving some sort of monetary value. Such financial instrument shall include an agreement between a lender (also known and referred to herein as "creditor," "vendor" and "PPA Investor") and consumer/borrower for financing consumer premises equipment (CPE). A power purchase agreement (PPA) is an example of a financial instrument. Financial instruments shall include "notes." Financial instruments are also known as securities.

"foreclosure" shall mean a method of enforcing a security interest in real property.

"intervention" (also referred to as "shut off") means the interference of or the ability (i.e., the right) to interfere with a consumer's ability to use power generated by the CPE or provided by a utility.

"lender" (also referred to as "creditor," "vendor," and "PPA Investor") shall mean an entity that provides the financing for the CPE. A lender shall include an entity that provides a loan to a consumer for the purchase of the CPE or a PPA investor that actually purchases CPE for power generation and purchase by a consumer.

"license" shall mean the right of one entity to enter the real property of another. A license does not attach to the real property and therefore cannot be enforced against all who own or lease the real property.

"loan" shall mean an arrangement in which a lender gives money to a borrower (e.g., the consumer), and the borrower agrees to repay the money, usually along with interest, at some future point(s) in time. A loan is usually evidenced by a specific financial instrument (or financial instruments).

"mortgage" (or "mortgages") shall mean a debt financial instrument by which the borrower (mortgagor or consumer) gives the lender (mortgagee) a lien on property as security for the repayment of a loan.

"personal property" shall mean property of any kind except real property. Personal property may be tangible, having physical existence, or intangible, having no physical existence, such as financial instruments. Personal property shall include, without limitation, receivables, credits and subsidies.

"power purchase agreement (also known as "PPA") shall mean an agreement in which a PPA Investor agrees to purchase and install CPE, and the consumer agrees to purchase the power generated by the CPE for a period of time. A power purchase agreement may be treated as or incorporate a lease of the CPE by the consumer.

"power" shall mean electricity. Power is also known as or referred to as "electricity" or "energy."

"power grid" (also known as the "power transmission and distribution grid," "electric grid" or "grid") shall mean the network of transmission and distribution lines (and the step-up and step-down transformers) that is used to deliver electricity to consumers.

"power proxy" shall mean a representative of the monetary value of power generated (over a set time period). Power proxy shall include, without limitation, receivables, cash flow, power, regulatory rights in power generated by the CPE and intervention rights in the CPE.

"PPA Investor" shall mean an entity that provides the financing for CPE in connection with a power purchase agreement with a consumer.

"provision" shall mean any portion, text, section or language of an agreement between a consumer and lender for financing CPE. The terms "provision" and "section" are used interchangeably in this application. A provision may be in the body of the agreement, or alternatively, it may be set forth in an attachment to the agreement.

"real property" shall mean the land as well as any permanent fixtures on it including buildings, trees and other fixtures.

"rebates" shall mean a deduction from the amount due or a return of part of an amount given in payment.

"receivables" shall mean any payment, instrument or other valuable consideration owed to an entity (e.g., consumer) for the power generated by the CPE, whether or not such payment, instrument or other valuable consideration is currently due. The receivables may be provided by a utility or other entity. Receivables shall include, without limitation, any credit, money certificate or other quantifiable value for power generated by a CPE.

"regulatory rights" shall mean any rights provided by a regulatory entity.

"renewable energy" shall mean power supplied by energy sources that are naturally and continually replenished such as wind, solar power, geothermal, hydropower, and various forms of biomass.

"renewable energy source" shall mean sources of renewable energy such as water (hydroelectric power), wind, biomass and solar energy.

"securing" shall mean the step or steps of taking a security interest in collateral.

"security interest" shall mean any interest in a property that secures the payment of an obligation. The property subject to a security interest is often times called collateral. Security interests shall include attaching the security interest in the collateral and perfecting the security interest.

"shut off" (also known as disconnected, interrupted and "intervention") shall mean the interference with a consumer's use of power generated by the CPE or provided by a utility.

"subsidies" shall mean a monetary grant given by government to lower the price of a good such as CPE, generally because they are considered to be in the public interest.

"utility" shall mean any entity that purchases, sells or markets power to (or from) the consumer of power or has the primary relationship with that consumer.

I claim:

1. A method for controlling the delivery of power generated by renewable energy consumer premises equipment (CPE) at a consumer premises, the renewable energy CPE adapted to deliver power onto the consumer premises and a power grid, the method comprising:
   monitoring, by a computer, payments required to be made by a consumer under a financing agreement between a non-utility entity and the consumer for the renewable energy CPE located at the consumer premises; and
   upon detecting the default of the agreement, communicating, by a computer, a control signal to a shut off control device coupled with the renewable energy CPE that controls power delivery from the renewable energy CPE to prevent power from flowing from the renewable energy CPE to the consumer premises; and
   in response to receiving the control signal, controlling, via the shut off control device, the operation of the renewable energy CPE by preventing power being generated by the renewable energy CPE from being used by the consumer premises.

2. The method of claim 1, further comprising creating a financial instrument as the financing agreement.

3. The method of claim 2 wherein creating the financial instrument includes creating a power purchase agreement in which the consumer makes payments to the non-utility entity for power generated by the renewable energy CPE.

4. The method of claim 2 wherein creating the financial instrument includes creating the agreement in which the non-utility entity provides a loan to the consumer for the consumer's purchase of the renewable energy CPE and the consumer makes payments to the non-utility entity for repayment of the loan for the renewable energy CPE.

5. The method of claim 1 further comprising securing by the non-utility entity the financing based on the monetary value of the power generated by the renewable energy CPE under the agreement.

6. The method of claim 1 wherein the controlling includes shutting off a first portion of the consumer's power that is generated by the renewable energy CPE.

7. The method of claim 1 wherein the controlling includes shutting off a second portion of the consumer's power that is received from a power grid.

8. The method of claim 1 wherein the controlling includes using an inverter within the renewable energy CPE for controlling the operation thereof.

9. The method of claim 8 wherein using the inverter includes shutting off power generated by the renewable energy CPE.

10. The method of claim 8 wherein the controlling includes communicating wirelessly with the inverter to control the operation of the renewable energy CPE.

11. The method of claim 8 wherein the controlling includes communicating with the inverter by a wired connection to control the operation of the renewable energy CPE.

12. The method of claim 1 wherein the controlling includes using a microinverter or power optimizer within the renewable energy CPE for controlling the operation thereof.

13. The method of claim 1 further comprising detecting a default by the consumer under the agreement by failing to make a payment by a due date.

14. The method of claim 1 further comprising detecting a default by the consumer under the agreement by failing to pay real property taxes for the consumer's premises upon which the renewable energy CPE is disposed.

15. The method of claim 1 further comprising detecting a default by the consumer under the agreement by failing to maintain a right of way to access the renewable energy CPE.

16. The method of claim 1 further comprising detecting a default by the consumer under the agreement by failing to maintain insurance for the renewable energy CPE.

17. The method of claim 1, further comprising, in response to receiving the control signal, controlling, via the shut off control device, the operation of the renewable energy CPE by diverting the power being generated by the renewable energy CPE from the consumer premises to the power grid.

* * * * *